(12) United States Patent
Zhang et al.

(10) Patent No.: US 12,360,618 B2
(45) Date of Patent: Jul. 15, 2025

(54) KNOB-TYPE TOUCH DISPLAY DEVICE AND DETECTION METHOD THEREFOR

(71) Applicant: Wuhu Tianma Automotive Electronics Co., Ltd., Wuhu (CN)

(72) Inventors: Chuanhuang Zhang, Wuhu (CN); Yumin Xu, Wuhu (CN); Changzhi Wu, Wuhu (CN)

(73) Assignee: Wuhu Tianma Automotive Electronics Co., Ltd., Wuhu (CN)

( * ) Notice: Subject to any disclaimer, the term of this patent is extended or adjusted under 35 U.S.C. 154(b) by 0 days.

(21) Appl. No.: 18/778,221

(22) Filed: Jul. 19, 2024

(65) Prior Publication Data

US 2024/0370108 A1   Nov. 7, 2024

(30) Foreign Application Priority Data

Nov. 24, 2023   (CN) .......................... 202311607149.1

(51) Int. Cl.
| | | |
|---|---|---|
| *G06F 3/039* | (2013.01) | |
| *G06F 3/0362* | (2013.01) | |
| *G06F 3/041* | (2006.01) | |
| *G06F 3/044* | (2006.01) | |

(52) U.S. Cl.
CPC .......... *G06F 3/0393* (2019.05); *G06F 3/0362* (2013.01); *G06F 3/04166* (2019.05); *G06F 3/044* (2013.01)

(58) Field of Classification Search
CPC .. G06F 3/0362; G06F 3/0393; G06F 3/04166; G06F 3/044
See application file for complete search history.

(56) References Cited

U.S. PATENT DOCUMENTS

| | | | |
|---|---|---|---|
| 10,409,470 B2 * | 9/2019 | Powell | G06F 3/0338 |
| 11,126,296 B2 * | 9/2021 | Sasaki | G06F 3/044 |
| 11,416,089 B2 * | 8/2022 | Su | G06F 3/041 |
| 12,182,347 B2 * | 12/2024 | Weber | G06F 3/0362 |
| 2019/0377486 A1 * | 12/2019 | Powell | G06F 3/0383 |
| 2019/0391671 A1 * | 12/2019 | Pfau | G06F 3/0362 |
| 2020/0225765 A1 * | 7/2020 | Hori | G06F 3/03547 |
| 2024/0111373 A1 * | 4/2024 | Weber | G06F 3/038 |

FOREIGN PATENT DOCUMENTS

| | | |
|---|---|---|
| CN | 114730218 A | 7/2022 |
| CN | 115981499 A | 4/2023 |

* cited by examiner

*Primary Examiner* — Michael Pervan
(74) *Attorney, Agent, or Firm* — KDW FIRM PLLC

(57) ABSTRACT

Provided are a knob-type touch display device and a detection method therefor. The display device includes a touch display panel including multiple touch electrodes; a knob including multiple contact electrodes, where along a direction perpendicular to a plane where the touch display panel is located, a contact electrode overlaps a touch electrode; and a detection unit electrically connected to the touch electrode. In a self-detection phase, the detection unit is configured to transmit a first detection signal to the touch electrode overlapping any one of the contact electrodes and transmit a second detection signal to the touch electrode overlapping a remaining contact electrode; and the detection unit is further configured to acquire a capacitive sensing signal generated by the touch electrode in response to the first detection signal or the second detection signal and determine a current state of the knob according to the capacitive sensing signal.

20 Claims, 8 Drawing Sheets

(a)
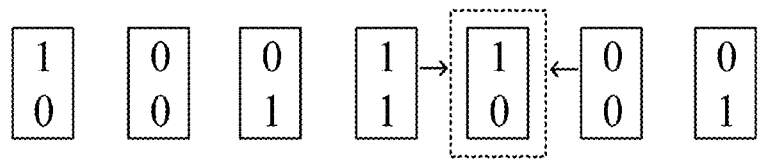
(b)
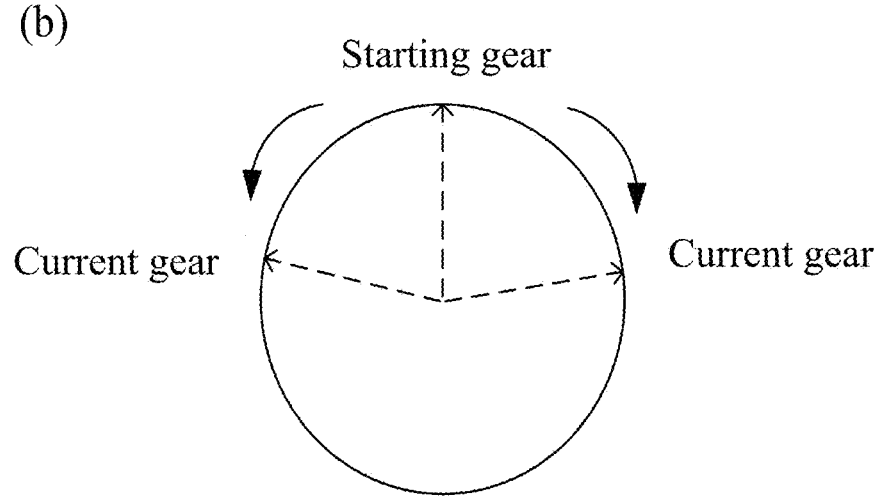
FIG. 1
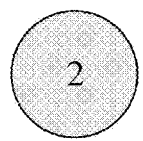
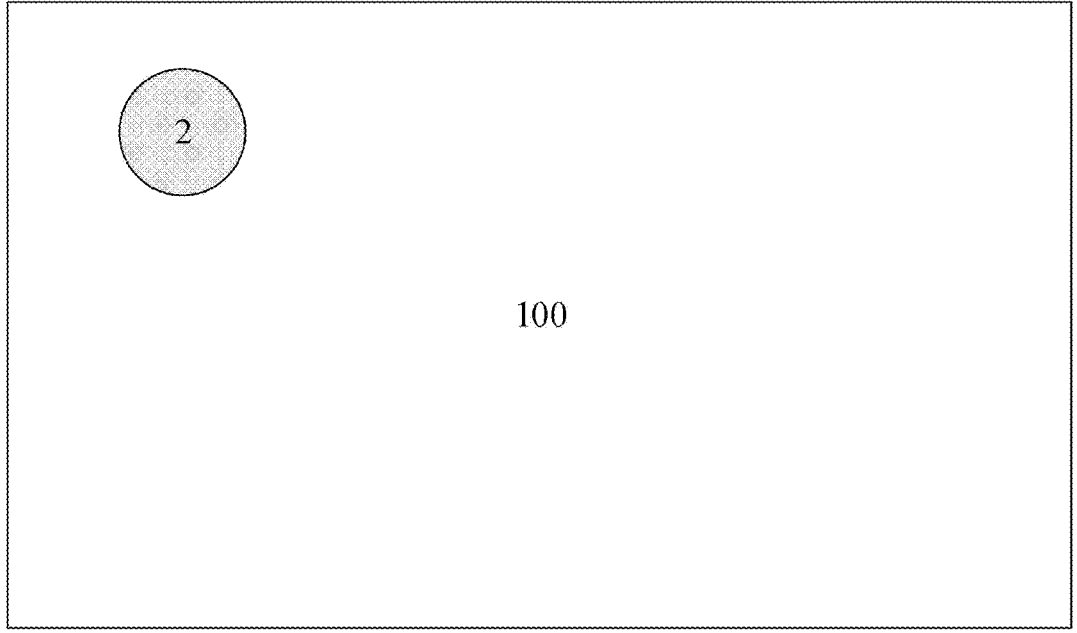
FIG. 2

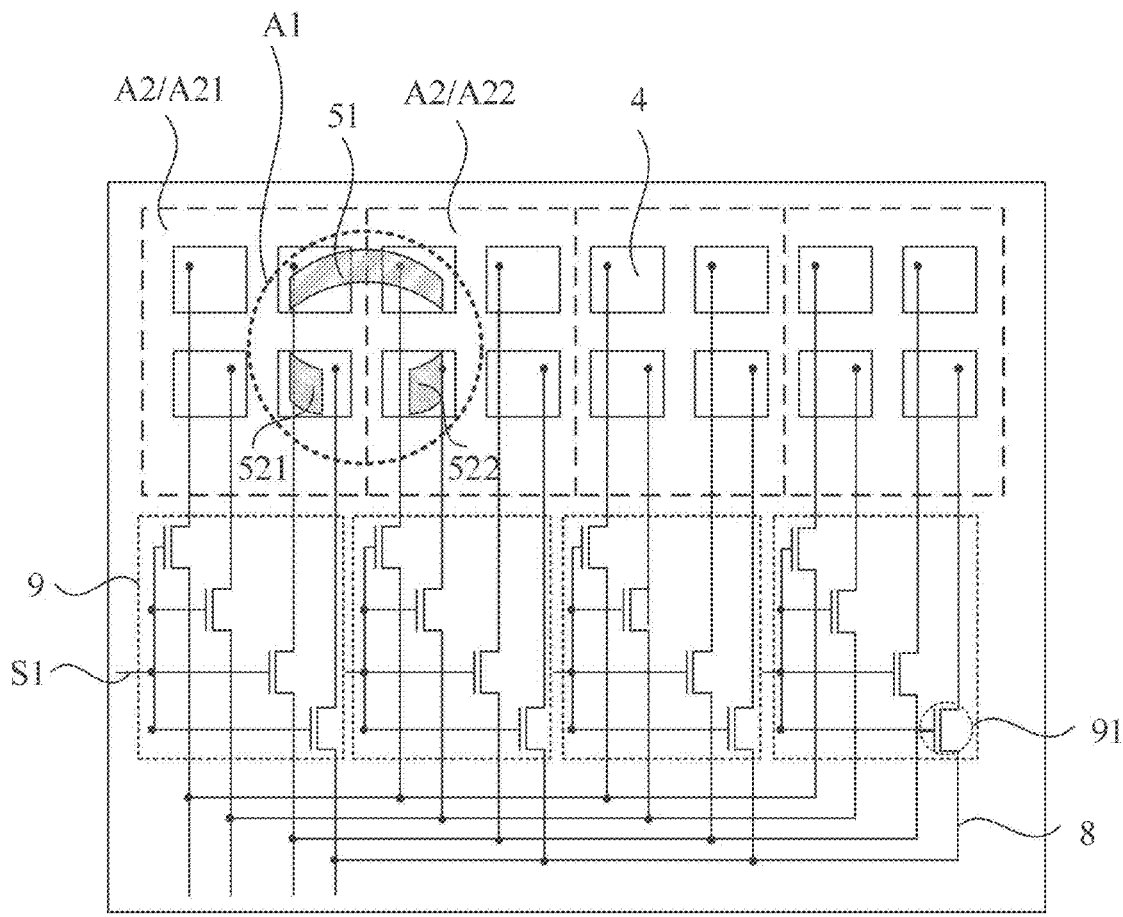

FIG. 9

| In a self-detection phase, transmit a first detection signal to a touch electrode overlapping any one contact electrode and transmit a second detection signal to the touch electrode overlapping a remaining contact electrode | S110 |

↓

| Acquire a capacitive sensing signal generated by the touch electrode in response to the first detection signal or the second detection signal and determine a current state of a knob according to the capacitive sensing signal | S120 |

FIG. 10

KNOB-TYPE TOUCH DISPLAY DEVICE AND DETECTION METHOD THEREFOR

CROSS-REFERENCE TO RELATED APPLICATION

This application claims priority to Chinese patent application No. 202311607149.1 filed with the CNIPA on Nov. 24, 2023, the disclosure of which is incorporated herein by reference in its entirety.

TECHNICAL FIELD

The present disclosure relates to the field of display technology and, in particular, to a knob-type touch display device and a detection method therefor.

BACKGROUND

With the development of display technology, touch display devices are applied more and more widely. With a touch display device in an in-vehicle product as an example, a knob is generally disposed in the touch display device in the related art, and the knob is manually rotated so that a corresponding function or gear is quickly changed and adjusted. However, the gear of the knob may be determined with an error in the related art, affecting the normal application of the knob.

SUMMARY

In view of this, the present disclosure provides a knob-type touch display device and a detection method therefor, so as to accurately identify a gear of a knob, ensure the normal application of the knob, and improve the reliability of the knob-type touch display device.

Embodiments of the present disclosure provide a knob-type touch display device including a knob setting region, a touch display panel, a knob, and a detection unit.

The touch display panel includes multiple touch electrodes, where part of the multiple touch electrodes are disposed in the knob setting region.

The knob is disposed on a light emission side of the touch display panel and in the knob setting region and includes multiple contact electrodes, where along a direction perpendicular to a plane where the touch display panel is located, a contact electrode of the multiple contact electrodes overlaps a respective touch electrode of the multiple touch electrodes; and when the contact electrode is bonded to the touch display panel, the contact electrode and the touch electrode overlapping the contact electrode form capacitance.

The detection unit is electrically connected to the touch electrode.

The knob-type touch display device includes a self-detection phase; and in the self-detection phase, the detection unit is configured to transmit a first detection signal to a touch electrode of the multiple touch electrodes overlapping any one of the multiple contact electrodes and transmit a second detection signal to a touch electrode of the multiple touch electrode overlapping a remaining contact electrode of the multiple contact electrodes, where the first detection signal is different from the second detection signal.

The detection unit is further configured to acquire a capacitive sensing signal generated by the touch electrode in response to the first detection signal or the second detection signal and determine a current state of the knob according to the capacitive sensing signal.

Embodiments of the present disclosure provide a detection method for a knob-type touch display device. The detection method is applied to the knob-type touch display device in the first aspect of the present disclosure and includes the steps below.

In the self-detection phase, a first detection signal is transmitted to the touch electrode overlapping any one of the multiple contact electrodes and a second detection signal is transmitted to the touch electrode overlapping a remaining contact electrode of the multiple contact electrodes, where the first detection signal is different from the second detection signal.

A capacitive sensing signal generated by the touch electrode in response to the first detection signal or the second detection signal is acquired and a current state of the knob is determined according to the capacitive sensing signal.

The embodiments of the present disclosure provide the knob-type touch display device including: the knob setting region; the touch display panel including the multiple touch electrodes, where part of the multiple touch electrodes are disposed in the knob setting region; the knob disposed on the light emission side of the touch display panel and in the knob setting region and including the multiple contact electrodes, where along the direction perpendicular to the plane where the touch display panel is located, the contact electrode overlaps the respective touch electrode, and when the contact electrode is bonded to the touch display panel, the contact electrode and the touch electrode overlapping the contact electrode form the capacitance; and the detection unit electrically connected to the touch electrode. The knob-type touch display device includes the self-detection phase; and in the self-detection phase, the detection unit is configured to transmit the first detection signal to the touch electrode overlapping any one contact electrode and transmit the second detection signal to the touch electrode overlapping the remaining contact electrode, where the first detection signal is different from the second detection signal; and the detection unit is further configured to acquire the capacitive sensing signal generated by the touch electrode in response to the first detection signal or the second detection signal and determine the current state of the knob according to the capacitive sensing signal. According to the preceding solution, the detection unit can accurately detect whether the knob is normally installed and a current gear of the knob, so as to ensure the normal application of the knob and improve the reliability of the knob-type touch display device.

BRIEF DESCRIPTION OF DRAWINGS

FIG. 1 is a schematic diagram of report points of a knob.

FIG. 2 is a top view of a knob-type touch display device according to an embodiment of the present disclosure.

FIG. 9 is a partial enlarged view of another knob-type touch display device according to an embodiment of the present disclosure.

FIG. 10 is a flowchart of a detection method for a knob-type touch display device according to an embodiment of the present disclosure.

DETAILED DESCRIPTION

Figure 3:
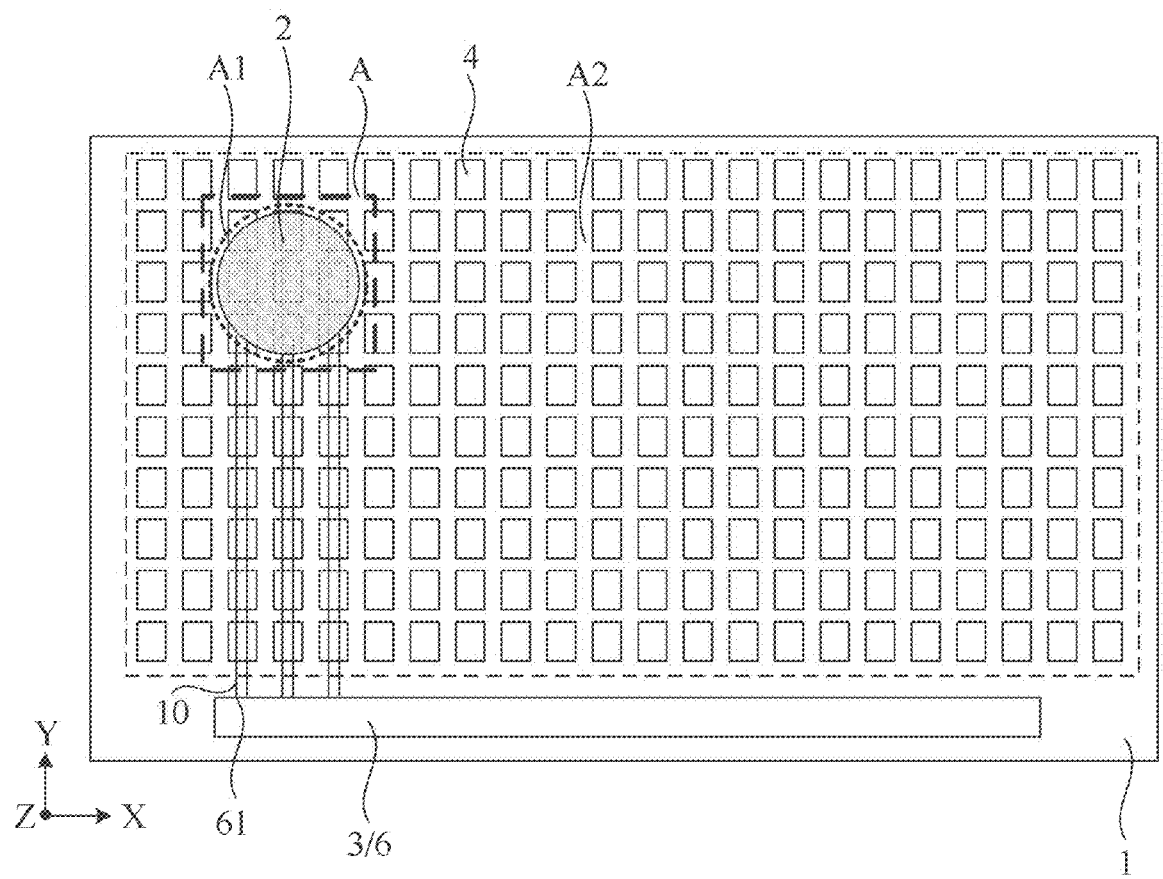
FIG. 3 is a structure diagram of the knob-type touch display device shown in FIG. 2.

The present disclosure is described in detail hereinafter in conjunction with drawings and embodiments. It is to be understood that the embodiments described herein are intended to illustrate the present disclosure and not to limit the present disclosure. Additionally, it is to be noted that for ease of description, only part, not all, of structures related to the present disclosure are illustrated in the drawings.

The terms used herein are intended to describe embodiments and not to limit the present disclosure. Terms such as "include" and "contain" used herein indicate the presence of described features, steps, operations, and/or components but do not exclude the presence or addition of one or more other features, steps, operations, or components.

It is to be understood that the orientation or positional relationship indicated by a term such as "longitudinal", "length", "circumferential", "front", "rear", "left", "right", "top", "bottom", "in", or "out" in the description of the present disclosure is based on a drawing. The term is used for ease and simplicity of description of the present disclosure and not for indicating or implying that a subsystem or element described must have a certain orientation or must be constructed or operated in a certain orientation and thus is not to be construed as limiting the present disclosure.

The same elements throughout the drawings are denoted by the same or similar reference numerals. When likely to cause a confused understanding of the present disclosure, a conventional structure or construction is omitted. The shape, size, or positional relationship of each component in a drawing does not reflect the actual size, proportion, or positional relationship. Any reference sign in a bracket of a claim does not limit the claim.

Similarly, to simplify the present disclosure and help understand one or more of the aspects of the present disclosure, features of the present disclosure in the description of example embodiments of the present disclosure are sometimes grouped into a single embodiment, drawing, or description thereof. The description of a reference term such as "an embodiment", "some embodiments", "example", or "some examples" means that features, structures, materials, or characteristics described in conjunction with any preceding embodiment or example are included in at least one embodiment or example of the present disclosure. In the description, the illustrative description of any preceding term does not necessarily refer to the same embodiment or example. Moreover, the features, structures, materials, or characteristics described may be combined properly in one or more embodiments or examples.

Moreover, the terms "first" and "second" are for description purposes and are not to be construed as indicating or implying relative importance or implicitly indicating the number of technical features indicated. Thus, a feature defined as a "first" feature or a "second" feature may explicitly or implicitly include one or more such features. In the description of the present disclosure, unless otherwise specified, "multiple" means at least two, for example, two or three.

In the context of the present disclosure, a layer/element referred to as being "on" another layer/element is in contact with the other layer/element or is in contact with an intervening layer/element between the two layers/elements. Additionally, a layer/element on another layer/element in one direction is under the other layer/element in an opposite direction.

A knob-type touch display panel is generally provided with multiple touch electrodes, where each touch electrode may be a self-capacitive touch electrode or a mutual capacitive touch electrode. With the self-capacitive touch electrode as an example, when a human body is in contact with the display panel, inductive capacitance is formed between the human body and the touch electrode, and a touch action and a position of the touch may be confirmed according to a detected capacitance change of the touch electrode. A working manner of a knob in a knob-type touch display device is based on the preceding principle. The knob is bonded to a display surface of the display panel, contact electrodes are disposed in the knob, and part of the contact electrodes are connected to a virtual ground. When the knob is normally bonded, capacitive sensing signals of touch electrodes overlapping the contact electrodes are detected during rotation of the knob so that a gear of the knob is determined. However, the gear of the knob may be determined with an error in the related art, which is mainly caused by the reasons below. Firstly, no gear is identified on the knob, and currently, the gear of the knob is determined according to the signals fed back by the touch electrodes under the knob and a point is reported. When the knob rotates clockwise, report points consist of (0, 0), (1, 0), (1, 1), and (0, 1) changing cyclically. When the knob rotates counterclockwise, the report points consist of (0, 0), (0, 1), (1, 1), and (1, 0) changing cyclically. A direction of rotation of the knob and a gear shifted to can be confirmed by a change between two successive gears. Since the gear of the knob cannot be accurately determined when the knob-type touch display device is powered up, the direction of rotation of the knob cannot be determined subsequently, and the gear of the knob is subsequently determined with an error. For example, FIG. 1 is a schematic diagram of the report points of the knob. FIG. 1(*a*) is a schematic diagram of cyclic report points. FIG. 1(*b*) is a schematic diagram of rotation of the knob. Assuming that the report point of the knob is (1, 0) after one rotation following the power-up, a starting gear may be (0, 0) or (1, 1). A change from (1, 1) to (1, 0) indicates that the knob rotates counterclockwise from the starting gear to a current gear. A change from (0, 0) to (1, 0) indicates that the knob rotates clockwise from the starting gear to the current gear. Due to a failure to know the starting gear, whether the knob rotates counterclockwise or clockwise cannot be determined, and the report point of the knob in the power-up may be wrong. Secondly, since a contact electrode is connected to the virtual ground, a capacitive sensing signal between a touch electrode and the contact electrode may be low in quantity, resulting in a failure to accurately distinguish a noise signal from an actual gear shift signal. Thirdly, in an extreme environment, such as an extremely cold or extremely humid environment, a capacitive sensing signal between a touch electrode and a contact electrode may change abnormally in quantity, resulting in a gear identification error.

Figure 4:
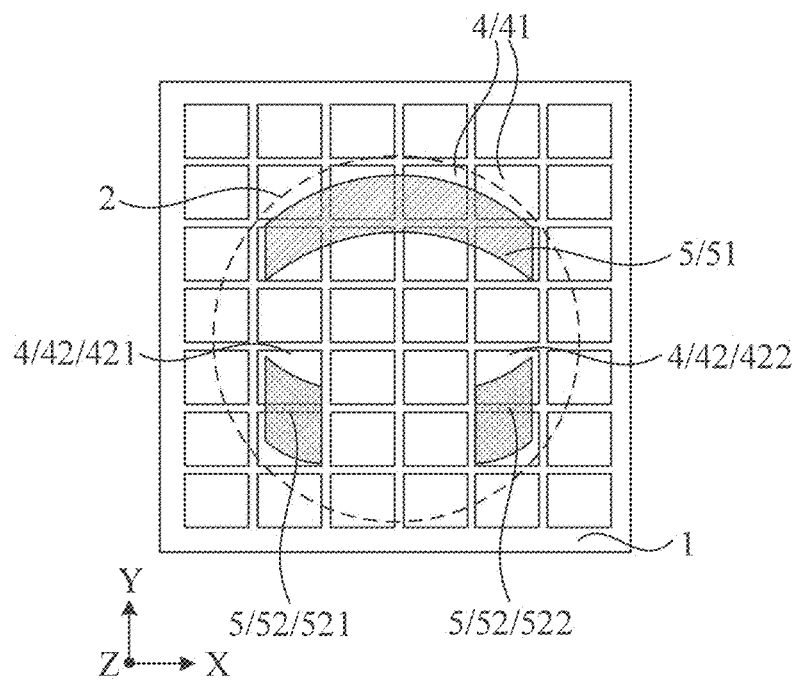
FIG. 4 is an enlarged view of A of FIG. 3.

Based on the preceding defects of the related art, embodiments of the present disclosure provide a knob-type touch display device which may be applied to any touch display device with a knob, such as, but not limited to, an in-vehicle display device. FIG. 2 is a top view of a knob-type touch display device according to an embodiment of the present disclosure. FIG. 3 is a structure diagram of the knob-type touch display device shown in FIG. 2. FIG. 4 is an enlarged view of A of FIG. 3. As shown in FIGS. 2 to 4, a knob-type touch display device 100 includes a knob setting region A1, a touch display panel 1, a knob 2, and a detection unit 3. The touch display panel 1 includes multiple touch electrodes 4, where part of the multiple touch electrodes 4 are disposed in the knob setting region A1. The knob is disposed on a light emission side of the touch display panel 1 and in the knob setting region A1. The knob 2 includes multiple contact electrodes 5, where along a direction perpendicular to a plane where the touch display panel 1 is located, a contact electrode 5 overlaps a respective touch electrode 4. When the contact electrode 5 is bonded to the touch display panel 1, the contact electrode 5 and the touch electrode 4 overlapping the contact electrode 5 form capacitance. The detection unit 3 is electrically connected to the touch electrode 4. The knob-type touch display device 100 includes a self-detection phase. In the self-detection phase, the detection unit 3 is configured to transmit a first detection signal to the touch electrode 4 overlapping any one contact electrode 5 and transmit a second detection signal to the touch electrode 4 overlapping a remaining contact electrode 5, where the first detection signal is different from the second detection signal. The detection unit 3 is further configured to acquire a capacitive sensing signal generated by the touch electrode 4 in response to the first detection signal or the second detection signal and determine a current state of the knob according to the capacitive sensing signal.

In an embodiment, referring to FIGS. 2 to 4, the knob-type touch display device 100 may include the knob setting region A1 and a display region A2, where the display region A2 is used for normal touch and display. The knob 2 is disposed in the knob setting region A1, and the knob setting region A1 may be located at any position of the knob-type touch display device 100 (which may be simply referred to as the "display device" hereinafter). FIGS. 2 and 3 illustratively show that the knob setting region A1 is located in an upper left corner of the display device, but it is not limited thereto in practice.

To implement a touch function, the multiple touch electrodes 4 are disposed in the touch display panel 1, the touch electrodes 4 are disposed in a touch layer, and a touch electrode 4 may be a self-capacitive touch electrode or a mutual capacitive touch electrode. The touch electrodes 4 may be arranged in an array on the touch display panel 1 along a first direction X and a second direction Y, where the first direction X and the second direction Y intersect and both overlap the plane where the touch display panel 1 is located. Part of the touch electrodes 4 are distributed in the knob setting region A1.

The knob 2 may be bonded on the light emission side (that is, a display surface) of the touch display panel 1. The knob 2 includes the multiple contact electrodes 5. The direction perpendicular to the plane where the touch display panel 1 is located may be defined as a third direction Z, and the third direction Z may be a direction from inside to outside of the surface in the figure. Along the third direction Z, the contact electrode 5 overlaps the touch electrode 4 in the knob setting region A1. If the knob 2 is normally bonded to the touch display panel 1, the capacitance is formed between the touch electrode 4 and the contact electrode 5 overlapping the touch electrode 4 in the third direction Z, and when different signals are transmitted to the touch electrode 4, different capacitances are formed between the touch electrode 4 and the contact electrode 5. An arrangement manner of the contact electrodes 5 in the knob 2 is not limited and may be set by those skilled in the art according to actual requirements.

With continued reference to FIGS. 2 to 4, the detection unit 3 may be electrically connected to the touch electrode 4 in the knob setting region A1. In the self-detection phase of the display device, the detection unit 3 transmits the first detection signal to part of touch electrodes 4 in the knob setting region A1 and transmits the second detection signal to another part of the touch electrodes 4. The touch electrodes 4 receiving the first detection signal and the touch electrodes 4 receiving the second detection signal both overlap the contact electrode 5. Moreover, at the same time, the touch electrodes 4 receiving the first detection signal and the touch electrodes 4 receiving the second detection signal overlap different contact electrodes 5, separately. The detection unit 3 may transmit the detection signals to the touch electrodes 4 and receive the capacitive sensing signals through a self-detection signal line 10. The self-detection signal line 10 may be an existing signal wire or an added signal wire in the touch display panel 1, which is not limited in the present disclosure.

Since the first detection signal is different from the second detection signal, if the knob 2 is normally bonded to the touch display panel 1, the capacitance between the touch electrode 4 receiving the first detection signal and the contact electrode 5 overlapping the touch electrode 4 is different from the capacitance between the touch electrode 4 receiving the second detection signal and the contact electrode 5 overlapping the touch electrode 4; thus, a signal quantity of the capacitive sensing signal generated by the touch electrode 4 receiving the first detection signal is different from a signal quantity of the capacitive sensing signal generated by the touch electrode 4 receiving the second detection signal. Moreover, when the knob 2 is at different gears, the contact electrodes 5 are at different positions, and overlapping areas between the contact electrodes 5 and touch electrodes 4 are different, which may cause a difference between capacitive sensing signals of the touch electrodes 4. Based on this, the detection unit 3 may determine, according to the acquired capacitive sensing signals of the touch electrodes 4, whether the contact electrodes 5 exist above the touch electrodes 4, then accurately determine positions of the contact electrodes 5, and determine the current gear of the knob 2 according to the positions of the contact electrodes 5.

Additionally, if the knob 2 is not normally bonded to the touch display panel 1, that is, the knob 2 falls off, no capacitance is formed between the contact electrode 5 and the touch electrode 4, and the capacitive sensing signals of the contact electrode 4 have no change. Therefore, in the embodiment of the present disclosure, the capacitive sensing signals of the touch electrodes 4 overlapping the contact electrodes 5 are acquired so that whether the knob 2 falls off can also be determined, so as to ensure the normal use of the knob.

In this embodiment, the detection signals are transmitted to the touch electrodes 4, and the positions of the contact electrodes 5 are determined according to a difference between capacitive sensing signals sensed by the touch electrodes 4. The problems of a low quantity of the capacitive sensing signal and an abnormal quantity of the capacitive sensing signal in an extreme environment in the related art can be avoided, thereby improving determination accuracy of the gear of the knob.

The detection unit 3 may be disposed in any bezel of the display device. FIG. 3 illustratively shows that the detection unit 3 is located in a lower bezel of the display device, but it is not limited thereto in practice.

In the embodiment of the present disclosure, the knob-type touch display device includes: the knob setting region; the touch display panel including the multiple touch electrodes, where part of the multiple touch electrodes are disposed in the knob setting region; the knob disposed on the light emission side of the touch display panel and in the knob setting region and including the multiple contact electrodes, where along the direction perpendicular to the plane where the touch display panel is located, the contact electrode overlaps the respective touch electrode, and when the contact electrode is bonded to the touch display panel, the contact electrode and the touch electrode overlapping the contact electrode form the capacitance; and the detection unit electrically connected to the touch electrode. The knob-type touch display device includes the self-detection phase; and in the self-detection phase, the detection unit is configured to transmit the first detection signal to the touch electrode overlapping any one contact electrode and transmit the second detection signal to the touch electrode overlapping the remaining contact electrode, where the first detection signal is different from the second detection signal; and the detection unit is further configured to acquire the capacitive sensing signal generated by the touch electrode in response to the first detection signal or the second detection signal and determine the current state of the knob according to the capacitive sensing signal. According to the preceding solution, the detection unit accurately detects whether the knob is normally installed and the current gear of the knob, so as to ensure the normal application of the knob and improve the reliability of the knob-type touch display device.

In an embodiment, continued reference may be made to FIGS. 3 and 4. the self-detection phase may include multiple detection sub-phases; the detection unit 3 is configured to, in each of the multiple detection sub-phases, transmit the first detection signal to the touch electrode 4 overlapping any one contact electrode 5 and transmit the second detection signal to the touch electrode 4 overlapping the remaining contact electrode 5; where in different detection sub-phases, different touch electrodes 4 receive the first detection signal; the detection unit 3 is further configured to acquire capacitive sensing signals generated by the touch electrode 4 in response to the first detection signal or the second detection signal in the multiple detection sub-phases and determine, according to the capacitive sensing signals generated by the touch electrode 4 in the multiple detection sub-phases, a current state of the contact electrode 5 overlapping the touch electrode 4; and the detection unit 3 is further configured to determine the current state of the knob 2 according to current states of the multiple contact electrodes 5.

In an embodiment, the self-detection phase may be divided into the multiple detection sub-phases, and in each detection sub-phase, the detection unit 3 performs the preceding steps of sending the detection signals and receiving the capacitive sensing signals. In each detection sub-phase, the touch electrode 4 overlapping one contact electrode 5 always exists to receive the first detection signal, and in different detection sub-phases, the detection unit 3 transmits the first detection signal to the touch electrodes 4 overlapping different contact electrodes 5.

For example, it is assumed that two contact electrodes 5 are provided, which are a first contact electrode 51 and a second contact electrode 52 separately. In one detection sub-phase, the detection unit 3 may send the first detection signal to the touch electrode 4 overlapping the first contact electrode 51 and send the second detection signal to the touch electrode 4 overlapping the second contact electrode 52. In another detection sub-phase, the detection unit 3 may send the first detection signal to the touch electrode 4 overlapping the second contact electrode 52 and send the second detection signal to the touch electrode 4 overlapping the first contact electrode 51.

In an embodiment, in each detection sub-phase, the detection unit 3 receives the capacitive sensing signals from the touch electrodes 4. When the touch electrodes 4 receive different detection signals, the touch electrodes 4 and the contact electrodes 5 generate different capacitive sensing signals in response to the detection signals, and the detection unit 3 detects different signal quantities of the capacitive sensing signals of the touch electrodes 4. For the touch electrode 4 overlapping a certain contact electrode 5, since the touch electrode 4 receives different detection signals in different detection sub-phases, the touch electrode 4 generates different capacitive sensing signals.

For example, still with the preceding assumption as a prerequisite, in one detection sub-phase, the detection unit 3 receives the capacitive sensing signal generated by the touch electrode 4 overlapping the first contact electrode 51 in response to the first detection signal and receives the capacitive sensing signal generated by the touch electrode 4 overlapping the second contact electrode 52 in response to the second detection signal. In another detection sub-phase, the detection unit 3 receives the capacitive sensing signal generated by the touch electrode 4 overlapping the first contact electrode 51 in response to the second detection signal and receives the capacitive sensing signal generated by the touch electrode 4 overlapping the second contact electrode 52 in response to the first detection signal.

In an embodiment, the detection unit 3 may determine the current states of the contact electrodes 5 in conjunction with the capacitive sensing signals of the touch electrodes 4 in the detection sub-phases. The detection unit 3 may determine the states of the contact electrodes 5 by comparing magnitudes of the capacitive sensing signals of different touch electrodes 4 in the same detection sub-phase and/or magnitudes of the capacitive sensing signals of the same touch electrode 4 in different detection sub-phases. The state of the contact electrode 5 may include an installation state of the contact electrode 5 and a position of the contact electrode 5.

In an embodiment, a comparison between capacitive sensing signals may be a comparison between signal quantities of the capacitive sensing signals or may be a comparison between digital signals corresponding to the capacitive sensing signals, which is not limited in the embodiment of the present disclosure. Any manner in which different capacitive sensing signals can be compared falls within the scope of the technical solutions protected in the embodiment of the present disclosure.

The installation state of the contact electrode 5 may reflect a bonding situation between the knob 2 and the touch display panel 1, and the positions of the contact electrodes 5 may reflect the current gear of the knob 2. Therefore, the detection unit 3 may determine the current state of the knob 2 according to the current states of the contact electrodes 5.

Figure 5:
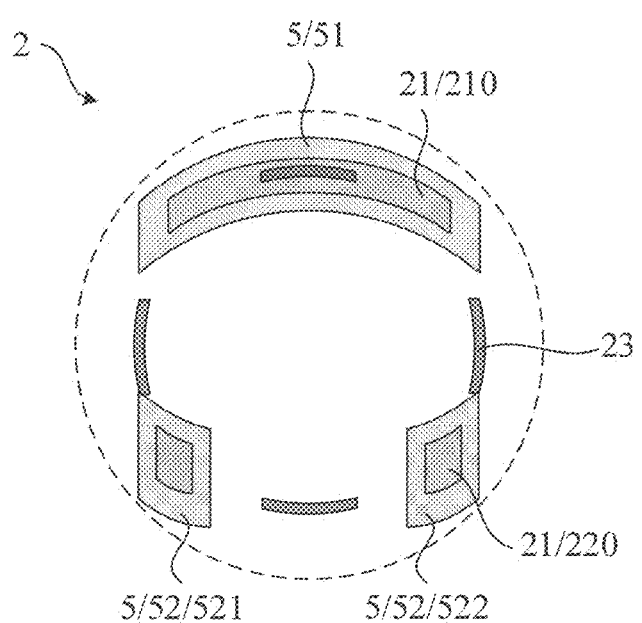
FIG. 5 is a structure diagram of a knob according to an embodiment of the present disclosure.

In an embodiment, FIG. 5 is a structure diagram of a knob according to an embodiment of the present disclosure. Referring to FIGS. 2 to 5, the knob 2 may further include multiple metal contacts 23 arranged at intervals along a circumferential direction of the knob; the multiple contact electrodes 5 include the first contact electrode 51 and the second contact electrode 52, where the first contact electrode 51 and the second contact electrode 52 are arranged in a circle; during rotation of the knob 2, the first contact electrode 51 is always in electrical contact with at least one of the multiple metal contacts 23, and the second contact electrode 52 is in electrical contact with or disconnected from a metal contact 23 so that the first contact electrode 51 is connected to or disconnected from the second contact electrode 52 through the multiple metal contacts 23; and the multiple touch electrodes 4 include a first touch electrode 41 and a second touch electrode 42, where along the direction perpendicular to the plane where the touch display panel 1 is located, the first touch electrode 41 overlaps the first contact electrode 51, and the second touch electrode 42 overlaps the second contact electrode 52.

In an embodiment, in the embodiment shown in FIG. 5, the knob 2 is circular, and the multiple contact electrodes 5 are arranged in a circle in the knob 2, where the illustrated shapes of the contact electrodes 5 are merely an example, but it is not limited thereto in practice. In addition to the contact electrodes 5, the knob 2 may further include multiple spring contacts 21 arranged at intervals along the circumferential direction of the knob 2 and the multiple metal contacts 23, where the multiple spring contacts 21 and the multiple metal contacts 23 are sequentially stacked on a side of the contact electrodes 5 facing away from the touch display panel. The metal contacts 23 may be connected to each other, and the spring contacts 21 may include a first spring contact 210 and a second spring contact 220. Along the direction perpendicular to the plane where the touch display panel 1 is located, the first spring contact 210 overlaps the first contact electrode 51, and the second spring contact 220 overlaps the second contact electrode 52.

During rotation of the knob 2, the metal contacts 23 rotate with the knob. During rotation, the metal contacts 23 are always in contact with the first contact electrode 51 through the first spring contact 210, and the metal contacts 23 are in contact with the second spring contact 220 when rotating to some positions and are not in contact with the second spring contact 220 when rotating to some other positions. When the metal contacts 23 are not in contact with the second spring contact 220, the first contact electrode 51 is disconnected from the second contact electrode 52. When the metal contacts 23 are in contact with the second spring contact 220, the first contact electrode 51 is connected to the second contact electrode 52. Different contact states between the metal contacts 23 and the spring contacts 21 (that is, the contact electrodes 5) may reflect the gear of the knob 2.

Dimensions of the first contact electrode 51, the second contact electrode 52, the first spring contact 210, and/or the second spring contact 220 and an arrangement manner of the multiple metal contacts 23 may be designed so that the metal contacts 23 are always in contact with the first contact electrode 51 through the first spring contact 210 and are in selective contact with the second contact electrode 52. For example, it may be set that among orthographic projection patterns on the touch display panel, a projection pattern of the first spring contact 210 is within a projection pattern of the first contact electrode 51, a projection pattern of the second spring contact 220 is within a projection pattern of the second contact electrode 52, a span of the first spring contact 210 along the circumferential direction of the knob 2 is greater than an interval between adjacent metal contacts 23 along the circumferential direction of the knob 2, and a span of the second spring contact 220 along the circumferential direction of the knob 2 is less than the interval between adjacent metal contacts 23 along the circumferential direction of the knob 2.

When the first contact electrode 51 and the second contact electrode 52 are in different connection states, the touch electrodes 4 overlapping the contact electrodes 5 sense different changes in capacitance. Therefore, the detection unit 3 may determine the current gear of the knob 2 according to capacitive sensing signals of the first touch electrode 41 and the second touch electrode 42.

In one detection sub-phase, the first detection signal is transmitted to the first touch electrode 41 overlapping the first contact electrode 51, and the second detection signal is transmitted to the second touch electrode 42 overlapping the second contact electrode 52; and in another detection sub-phase, the first detection signal is transmitted to the second touch electrode 42 overlapping the second contact electrode 52, and the second detection signal is transmitted to the first touch electrode 41 overlapping the first contact electrode 51. Assuming that the first contact electrode 51 is in contact with the second contact electrode 52, in a first detection sub-phase, the capacitive sensing signal fed back by the first touch electrode 41 is similar to or the same as the capacitive sensing signal fed back by the second touch electrode 42; and in a second detection sub-phase, the capacitive sensing signal fed back by the first touch electrode 41 is similar to or the same as the capacitive sensing signal fed back by the second touch electrode 42. Moreover, the capacitive sensing signal fed back by the second touch electrode 42 in the first detection sub-phase is similar to or the same as the capacitive sensing signal fed back by the second touch electrode 42 in the second detection sub-phase. Assuming that the first contact electrode 51 is disconnected from the second contact electrode 52, in the first detection sub-phase, the capacitive sensing signal fed back by the first touch electrode 41 has a relatively large difference from the capacitive sensing signal fed back by the second touch electrode 42; and in the second detection sub-phase, the capacitive sensing signal fed back by the first touch electrode 41 has a relatively large difference from the capacitive sensing signal fed back by the second touch electrode 42. Moreover, the capacitive sensing signal fed back by the second touch electrode 42 in the first detection sub-phase has a relatively large difference from the capacitive sensing signal fed back by the second touch electrode 42 in the second detection sub-phase.

Therefore, the detection unit 3 may determine a connection state between the second contact electrode 52 and the first contact electrode 51 according to the capacitive sensing signals generated by the first touch electrode 41 and the second touch electrode 42 in the detection sub-phases and determine the current gear of the knob 2 according to the connection state between the second contact electrode 52 and the first contact electrode 51.

It is to be noted that as can be seen from the preceding analysis, the connection state between the first contact electrode 51 and the second contact electrode 52 can be determined even if only one detection sub-phase is executed. However, due to an effect of an ambient environment on the capacitive sensing signal, in this embodiment, the connection state between the contact electrodes 5 is determined in conjunction with the capacitive sensing signals of the touch electrodes 4 in the multiple detection sub-phases, which can reduce the effect of the ambient environment and improve gear detection accuracy.

In an embodiment, the number of detection sub-phases may be set by those skilled in the art, and the number of detection sub-phases may be the same as or different from the number of contact electrodes 5.

For example, with continued reference to FIGS. 2 to 5, the second contact electrode 52 may include a first contact sub-electrode 521 and a second contact sub-electrode 522, and the second touch electrode 42 includes a first touch sub-electrode 421 and a second touch sub-electrode 422; where along the direction perpendicular to the plane where the touch display panel 1 is located, the first contact sub-electrode 521 overlaps the first touch sub-electrode 421, and the second contact sub-electrode 522 overlaps the second touch sub-electrode 422.

As shown in FIGS. 4 and 5, one first contact electrode 51 and two second contact electrodes 52 may be provided, the first contact electrode 51 may be a ground contact electrode, and the second contact electrode 52 may be a sensing contact electrode. The first contact electrode 51, the first contact sub-electrode 521, and the second contact sub-electrode 522 may be distributed in a circle, and correspondingly, the first touch electrode 41, the first touch sub-electrode 421, and the second touch sub-electrode 422 are also distributed in a circle. During a normal application of the display device, a ground signal may always be transmitted to the first touch electrode 41 overlapping the ground contact electrode, and the capacitive sensing signal of the first touch sub-electrode 421 overlapping the first contact sub-electrode 521 and the capacitive sensing signal of the second touch sub-electrode 422 overlapping the second contact sub-electrode 522 are detected. A connection state between the first contact electrode 51 and the first contact sub-electrode 521 and a connection state between the first contact electrode 51 and the second contact sub-electrode 522 are determined according to the sensing signals of the first touch sub-electrode 421 and the second touch sub-electrode 422, and then the gear of the knob 2 is determined.

Figure 6:
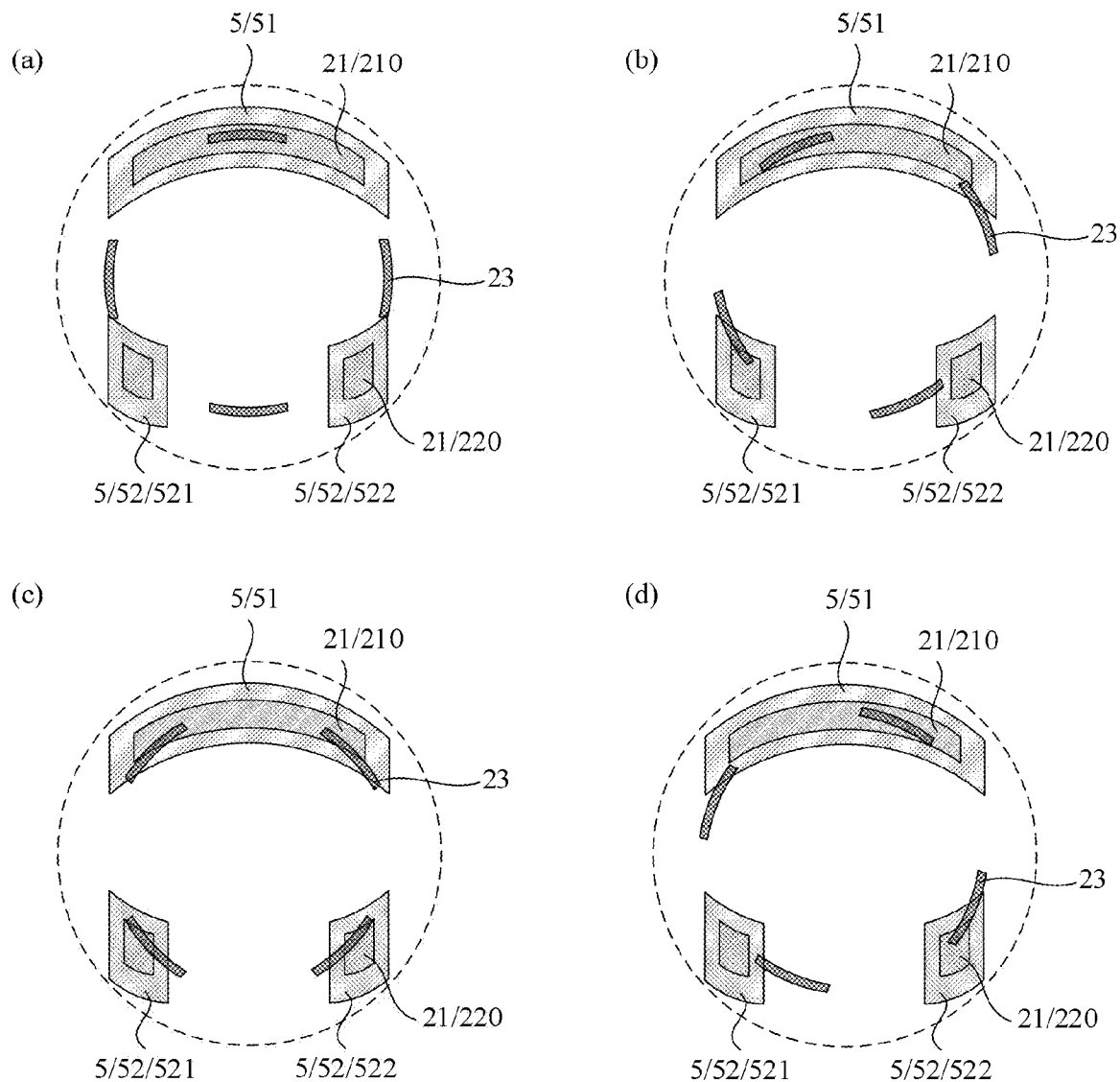
FIG. 6 is a schematic diagram of different connection states of a knob according to an embodiment of the present disclosure.

For example, FIG. 6 is a schematic diagram of different connection states of a knob according to an embodiment of the present disclosure. Referring to FIG. 6(a), in a first connection state, the metal contacts 23 are in contact with the first contact electrode 51 and are disconnected from both the first contact sub-electrode 521 and the second contact sub-electrode 522. In this case, a report point of the knob 2 may be (0, 0). Referring to FIG. 6(b), in a second connection state, the metal contacts 23 are in contact with the first contact electrode 51 and the first contact sub-electrode 521 and are disconnected from the second contact sub-electrode 522. In this case, the report point of the knob 2 may be (1, 0). Referring to FIG. 6(c), in a third connection state, the metal contacts 23 are in contact with the first contact electrode 51, the first contact sub-electrode 521, and the second contact sub-electrode 522. In this case, the report point of the knob 2 may be (1, 1). Referring to FIG. 6(d), in a fourth connection state, the metal contacts 23 are in contact with the first contact electrode 51 and the second contact sub-electrode 522 and are disconnected from the first contact sub-electrode 521. In this case, the report point of the knob 2 may be (0, 1). A connection state after the knob rotates clockwise once from a starting connection state is different from a connection state after the knob rotates counterclockwise once from the starting state. The capacitive sensing signals of the first touch sub-electrode and the second touch sub-electrode are detected so that a direction of rotation and a rotation angle of the knob may be determined.

In an embodiment, one or more first touch electrodes 41, one or more first touch sub-electrodes 421, and one or more second touch sub-electrodes 422 may be provided, and details are not repeated in the embodiments of the present disclosure. The number of first touch electrodes 41, the number of first touch sub-electrodes 421, and the number of second touch sub-electrodes 422 shown in the figure are merely an example.

The number of detection sub-phases may be greater than, equal to, or less than the number of contact electrodes 5. For example, the number of contact electrodes 5 in this embodiment is 3, and the number of detection sub-phases may be 2, 3, or 4, but it is not limited thereto. In this embodiment, determination logics are described by using an example in which the number of detection sub-phases is the same as the number of contact electrodes 5.

In an embodiment, the self-detection phase may be divided into a first detection sub-phase, a second detection sub-phase, and a third detection sub-phase. In the first detection sub-phase, the detection unit 3 may transmit the first detection signal to the first touch electrode 41 and transmit the second detection signal to the first touch sub-electrode 421 and the second touch sub-electrode 422; then, the detection unit 3 may acquire a seventh capacitive sensing signal generated by the first touch electrode 41 in response to the first detection signal, a first capacitive sensing signal generated by the first touch sub-electrode 421 in response to the second detection signal, and a second capacitive sensing signal generated by the second touch sub-electrode 422 in response to the second detection signal.

In the second detection sub-phase, the detection unit 3 may transmit the first detection signal to the first touch sub-electrode 421 and transmit the second detection signal to the first touch electrode 41 and the second touch sub-electrode 422; then, the detection unit 3 may acquire an eighth capacitive sensing signal generated by the first touch electrode 41 in response to the second detection signal, a third capacitive sensing signal generated by the first touch sub-electrode 421 in response to the first detection signal, and a fourth capacitive sensing signal generated by the second touch sub-electrode 422 in response to the second detection signal.

In the third detection sub-phase, the detection unit 3 may transmit the first detection signal to the second touch sub-electrode 422 and transmit the second detection signal to the first touch electrode 41 and the first touch sub-electrode 421; then, the detection unit 3 may acquire a ninth capacitive sensing signal generated by the first touch electrode 41 in response to the second detection signal, a fifth capacitive sensing signal generated by the first touch sub-electrode 421 in response to the second detection signal, and a sixth capacitive sensing signal generated by the second touch sub-electrode 422 in response to the first detection signal.

The detection unit 3 may determine the connection state between the first contact sub-electrode 521 and the first contact electrode 51 and the connection state between the second contact sub-electrode 522 and the first contact electrode 51 according to a comparison result of the capacitive sensing signals of the first touch electrode 41, the first touch sub-electrode 421, and the second touch sub-electrode 422 in the detection sub-phases and then determine a current gear state of the knob 2.

For example, in the first detection sub-phase, assuming that the detection unit 3 detects that the first capacitive sensing signal and the seventh capacitive sensing signal are similar or the same (for example, a difference between the first capacitive sensing signal and the seventh capacitive sensing signal is less than or equal to a threshold) and the second capacitive sensing signal and the seventh capacitive sensing signal have a relatively large difference (for example, a difference between the second capacitive sensing signal and the seventh capacitive sensing signal is greater than a threshold), it is determined that the first contact sub-electrode 521 is connected to the first contact electrode 51 and the second contact sub-electrode 522 is disconnected from the first contact electrode 51. In the second detection sub-phase, assuming that the detection unit 3 detects that the third capacitive sensing signal and the eighth capacitive sensing signal are similar or the same and the fourth capacitive sensing signal and the eighth capacitive sensing signal have a relatively large difference, it is determined that the first contact sub-electrode 521 is connected to the first contact electrode 51 and the second contact sub-electrode 522 is disconnected from the first contact electrode 51. In the third detection sub-phase, assuming that the detection unit 3 detects that the fifth capacitive sensing signal and the ninth capacitive sensing signal are similar or the same and the sixth capacitive sensing signal and the ninth capacitive sensing signal have a relatively large difference, it is determined that the first contact sub-electrode 521 is connected to the first contact electrode 51 and the second contact sub-electrode 522 is disconnected from the first contact electrode 51. In conjunction with the determination results in the preceding three detection sub-phases, it may be concluded that the first contact sub-electrode 521 is connected to the first contact electrode 51 and the second contact sub-electrode 522 is disconnected from the first contact electrode 51 and thus it is determined that the knob 2 is in the second connection state shown in FIG. 6.

Figure 7:
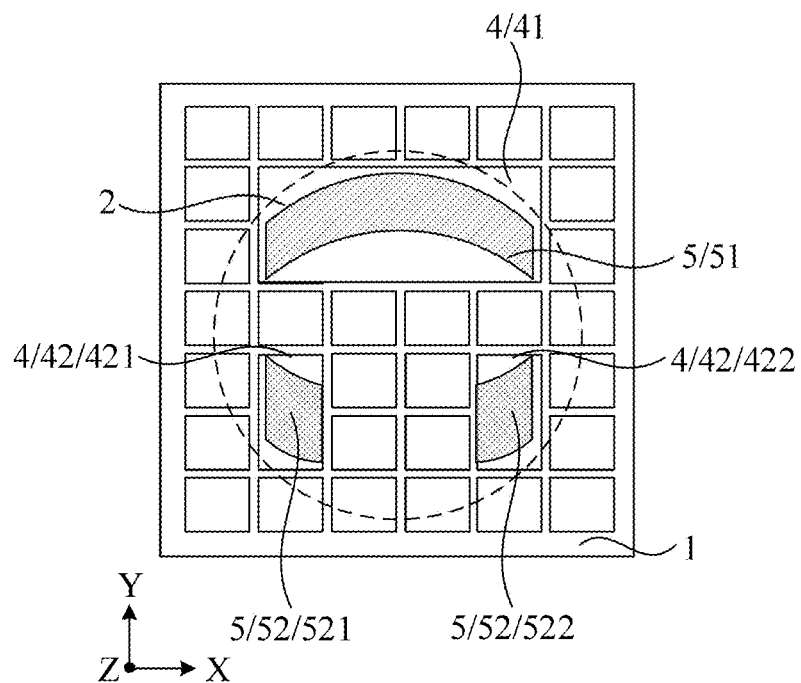
FIG. 7 is a partial enlarged view of a knob-type touch display device according to an embodiment of the present disclosure.

In an embodiment, FIG. 7 is a partial enlarged view of a knob-type touch display device according to an embodiment of the present disclosure. Referring to FIGS. 7 and 4, along the direction perpendicular to the plane where the touch display panel 1 is located, one touch electrode 4 overlaps one contact electrode 5, and a projection of the touch electrode 4 on the plane where the knob-type touch display panel 1 is located covers a projection of the contact electrode 5 on the plane where the knob-type touch display panel 1 is located; or along the direction perpendicular to the plane where the knob-type touch display panel 1 is located, at least two touch electrodes 4 overlap the same contact electrode 5.

For example, in the embodiment shown in FIG. 7, along the third direction Z, the first contact electrode 51 overlaps one first touch electrode 41, the first contact sub-electrode 521 overlaps one first touch sub-electrode 421, and the second contact sub-electrode 522 overlaps one second touch sub-electrode 422. Moreover, the projection of each contact electrode 5 is covered by the projection of the corresponding touch electrode 4. Projection coverage may include that an area of the projection pattern of the touch electrode 4 is greater than or equal to an area of the projection pattern of the corresponding contact electrode 5. In this setting manner, in the self-detection phase, the detection unit 3 may transmit the detection signal to one touch electrode 4 overlapping the contact electrode 5 and acquire the capacitive sensing signal of the touch electrode 4. Compared with a touch electrode 4 not overlapping the contact electrode 5, the touch electrode 4 overlapping the contact electrode 5 has a larger area so that the signal quantity of the capacitive sensing signal of the touch electrode 4 increases, the capacitive sensing signal is easier to monitor, and the capacitive sensing signal can be prevented from being affected by the ambient environment.

For example, in the embodiment shown in FIG. 4, along the third direction Z, at least two first touch electrodes 41 overlap the first contact electrode 51, at least two first touch sub-electrodes 421 overlap the first contact sub-electrode 521, and at least two second touch sub-electrodes 422 overlap the second contact sub-electrode 522. In this setting manner, in the detection sub-phase, the detection unit 3 should transmit the same detection signal to the touch electrodes 4 overlapping the same contact electrode 5, receive capacitive sensing signals of the touch electrodes 4, and determine the state of the contact electrode 5 in conjunction with the capacitive sensing signals of all the touch electrodes 4 overlapping the same contact electrode 5. In this manner, the shape of the touch electrode 4 does not need to be improved, and the connection state between the contact electrodes 5 is determined in conjunction with capacitive sensing signals of multiple touch electrodes 4 so that determination accuracy of the connection state between the contact electrodes 5 can be improved.

In an embodiment, based on the preceding embodiment shown in FIG. 4, the present disclosure further proposes that the detection sub-phase includes at least two detection frames, and the detection frames are arranged in sequence in a time dimension. The number of detection frames in one detection sub-phase may be the same as the number of touch electrodes 4 under any contact electrode 5, which is not limited in the embodiment of the present disclosure.

In the at least two detection frames of the same detection sub-phase, the detection unit 3 sequentially transmits the first detection signal to different touch electrodes 4 overlapping the same contact electrode 5 and sequentially transmits the second detection signal to different touch electrodes 4 overlapping the remaining contact electrode 5. In an embodiment, the detection unit 3 may separately acquire second capacitive sensing sub-signals generated by the different touch electrodes 4 overlapping the same contact electrode 5 in response to the first detection signal or the second detection signal in different detection frames of the same detection sub-phase and superimpose the second capacitive sensing sub-signals to form the capacitive sensing signal.

In an embodiment, in this embodiment, the detection sub-phase is divided into multiple detection frames, the detection signal is transmitted to only part of all the touch electrodes 4 overlapping each contact electrode 5 in each detection frame, and it is ensured that all the touch electrodes 4 overlapping the contact electrode 5 receive the detection signal in one detection sub-phase. In a certain detection sub-phase, the detection unit 3 sequentially transmits the detection signal to part of the touch electrodes 4 under each contact electrode 5 and then acquires the second capacitive sensing sub-signals fed back by the touch electrodes 4 in the detection frames. A second capacitive sensing sub-signal is a capacitive sensing signal of part of the touch electrodes 4 under the same contact electrode 5. In an embodiment, the detection unit 3 adds signal quantities of the second capacitive sensing sub-signals of all the touch electrodes 4 under the same contact electrode 5 to obtain a signal quantity of the capacitive sensing signal of the touch electrodes 4 under the contact electrode 5 and uses the capacitive sensing signal after superimposition as a parameter for a subsequent signal comparison. In this manner, the signal quantity of the capacitive sensing signal can also be increased so that the capacitive sensing signal is easier to monitor, and the capacitive sensing signal is prevented from being affected by the ambient environment.

In an embodiment, with continued reference to FIG. 3, the knob-type touch display device may further include a driver chip 6, the detection unit 3 is integrated into the driver chip 6, and the driver chip 6 is further configured to control the knob-type touch display device to perform image display in a working phase.

The driver chip 6 may be a main drive unit of the display device. The driver chip 6 may be, but is not limited to, an integrated chip of touch and display drive. Driven by the driver chip 6, the display device completes touch and image display. As an exemplary embodiment, the detection unit 3 may be integrated into the driver chip 6, thereby improving integration of the drive unit of the display device and reducing an area occupied by the detection unit 3.

Of course, in other embodiments not illustrated, the detection unit 3 may be separately disposed. In this case, an original structure of the driver chip 6 does not need to be changed, and an existing driver chip 6 may be used.

In an embodiment, the first detection signal may be the ground signal, and the second detection signal may be an analog voltage signal. In response to the ground signal, the touch electrode 4 feeds back a capacitive sensing signal with a relatively low signal quantity. In response to the analog voltage signal, the touch electrode 4 feeds back a capacitive sensing signal with a relatively high signal quantity. In some exemplary embodiments, the analog voltage signal may be a rectangular wave signal. Compared with a sine wave signal, the rectangular wave signal lasts for a relatively long time at high and low levels so that the capacitive sensing signal has a greater signal quantity and is easier to monitor.

When the detection unit 3 is integrated into the driver chip 6, in the self-detection phase, the detection unit 3 is further configured to transmit, through a signal output port 61 of the driver chip 6, the ground signal or the rectangular wave signal to the touch electrode 4 overlapping the contact electrode 5. Alternatively, the knob-type touch display device further includes a signal output unit, where an end of the signal output unit is electrically connected to the touch electrode 4, and the other end of the signal output unit is electrically connected to the detection unit 3 through a signal output port 61 of the driver chip 6; and in the self-detection phase, the detection unit 3 is further configured to transmit, through the signal output port 61 of the driver chip 6, the ground signal or a third detection signal to the touch electrode 4 overlapping the contact electrode 5, where the third detection signal is converted by the signal output unit into the rectangular wave signal.

In an embodiment, in some embodiments of the present disclosure, both the ground signal and the rectangular wave signal may be directly output from the driver chip 6. For example, as shown in FIG. 3, the signal output port 61 of the driver chip 6 is electrically connected to each touch electrode 4 so that the ground signal or the rectangular wave signal is sent to the touch electrode 4 through the signal output port 61 of the driver chip 6. In this manner, a rectangular wave signal generation unit does not need to be additionally disposed in the display device, and an increase in an area of a bezel region is avoided.

Figure 8:
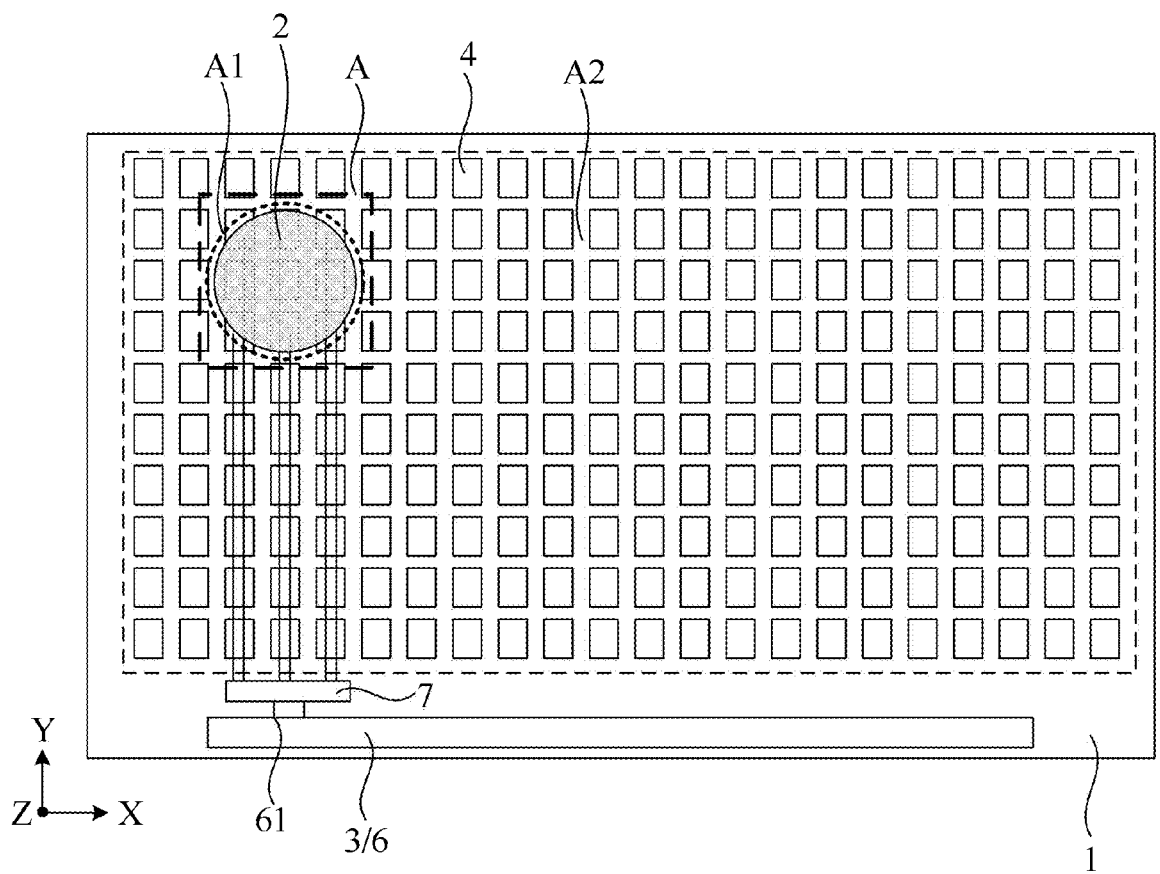
FIG. 8 is a structure diagram of another knob-type touch display device according to an embodiment of the present disclosure.

Alternatively, in some other embodiments of the present disclosure, the rectangular wave signal may be obtained through conversion of another module. In an embodiment, FIG. 8 is a structure diagram of another knob-type touch display device according to an embodiment of the present disclosure. In the embodiment shown in FIG. 8, a signal output unit 7 may be disposed in the display device, and the detection unit 3 may be electrically connected to the touch electrode 4 through the signal output unit 7. In this setting manner, the detection unit 3 sends the ground signal and the third detection signal, where the third detection signal may be a signal waveform that can be sent by the existing driver chip 6, such as, but not limited to, the sine wave signal. The ground signal and the third detection signal are transmitted to the signal output unit 7 through the signal output port 61 of the driver chip 6, and the signal output unit 7 is configured to convert the third detection signal into the rectangular wave signal. The ground signal remains unchanged through the signal output unit 7 and is still transmitted to the touch electrode 4 as the ground signal. The third detection signal is converted into the rectangular wave signal through the signal output unit 7, and the rectangular wave signal is transmitted to the touch electrode 4.

The signal output unit 7 is additionally disposed so that an existing output port of the driver chip 6 can be directly used for outputting the detection signals, and the structure of the driver chip 6 does not need to be changed.

In an embodiment, FIG. 9 is a partial enlarged view of another knob-type touch display device according to an embodiment of the present disclosure. Referring to FIG. 9, the knob-type touch display device in the embodiment of the present disclosure may perform touch detection at different times. The knob-type touch display device may be divided into multiple touch regions A2. For example, as shown in FIG. 9, the touch display panel 1 includes four touch regions A2, but it is not limited thereto in practice. Each touch region A2 includes multiple touch electrodes 4 arranged in a matrix. Touch signals sensed by the touch electrodes 4 in different touch regions A2 are acquired at different times. The knob-type touch display device further includes multiple touch detection signal lines 8, and each of the multiple touch electrodes 4 in each touch region A2 is electrically connected to a respective one of the multiple touch detection signal lines 8. A drive cycle of the display device is divided into multiple time periods. In each time period, paths between the touch electrodes 4 in only one touch region A2 and the touch detection signal lines 8 are controlled to be conducted, and only the touch electrodes 4 in this touch region A2 can transmit sensed touch detection signals to the touch detection signal lines 8 so that touch detection is performed in the multiple touch regions A2 at different times.

In an embodiment, as shown in FIG. 9, the knob-type touch display device may further include gating circuits 9 in a one-to-one correspondence with the multiple touch regions A2, each gating circuit 9 includes multiple gating switches 91, a control electrode of each gating switch 91 is electrically connected to a control signal line S1, a first electrode of the gating switch 91 is electrically connected to one touch electrode 4, and a second electrode of the gating switch 91 is electrically connected to one touch detection signal line 8; and control electrodes of the multiple gating switches 91 in the same gating circuit 9 are electrically connected to the same control signal line S1, and a second electrode of an i-th (i being an integer greater than or equal to 1) gating switch 91 in each of multiple gating circuits 9 is electrically connected to the same touch detection signal line 8. In one time period of the drive cycle, the control signal line S1 controls the multiple gating switches 91 corresponding to one of the touch regions A2 to turn on, and the touch electrodes 4 in the touch region A2 transmit the touch detection signals to the touch detection signal lines 8 electrically connected to the touch electrodes 4. The preceding procedures are performed in each time period until touch detection signals of the touch electrodes 4 in all the touch regions A2 are acquired.

On this basis, the embodiment of the present disclosure propose that a gating circuit 9 for a touch region A2 where the knob setting region A1 is located is controlled to turn on so that the first detection signal or the second detection signal may be transmitted. For example, as shown in FIG. 9, it is assumed that the knob setting region A1 overlaps two touch regions A2, the first contact electrode 51 is located in the two touch regions A2 (for example, a first touch region A21 and a second touch region A22), the first contact sub-electrode 521 is located in the first touch region A21, and the second contact sub-electrode 522 is located in the second touch region A22. In each detection sub-phase, a gating circuit 9 corresponding to the first touch region A21 and a gating circuit 9 corresponding to the second touch region A22 may be controlled to turn on, so as to transmit the detection signals to the touch electrodes overlapping the contact electrodes.

The touch electrodes 4 in each touch region A2 are selectively conducted by using the gating circuit 9 so that the number of laid detection signal wires can be reduced, wiring complexity can be reduced, and a space occupied by the wires can be reduced.

The preceding gating circuits 9 may be integrated into the driver chip 6 or separately disposed in the display device, which is neither described in detail nor limited in the embodiments of the present disclosure.

The knob-type touch display device provided by the embodiments of the present disclosure may further include any structure known to those skilled in the art, which is neither described in detail nor limited in the embodiments of the present disclosure.

Based on the same inventive concept, embodiments of the present disclosure further provide a detection method for a knob-type touch display device. The detection method may be used for detecting the knob-type touch display device according to any one of the preceding embodiments. Technical solutions provided in the embodiments of the present disclosure are described in more detail below in conjunction with the corresponding detection method. For some control logics not described in the preceding embodiments corresponding to the display device, reference may be made to the following embodiments corresponding to the detection method. FIG. 10 is a flowchart of a detection method for a knob-type touch display device according to an embodiment of the present disclosure. Referring to FIG. 10, the detection method includes S110 and S120.

In S110, in a self-detection phase, a first detection signal is transmitted to a touch electrode overlapping any one contact electrode and a second detection signal is transmitted to the touch electrode overlapping a remaining contact electrode.

The first detection signal is different from the second detection signal.

In S120, a capacitive sensing signal generated by the touch electrode in response to the first detection signal or the second detection signal is acquired and a current state of a knob is determined according to the capacitive sensing signal.

Since the first detection signal is different from the second detection signal, if the knob is normally bonded to a touch display panel, capacitance between the touch electrode receiving the first detection signal and the contact electrode overlapping the touch electrode is different from capacitance between the touch electrode receiving the second detection signal and the contact electrode overlapping the touch electrode; thus, a signal quantity of the capacitive sensing signal generated by the touch electrode receiving the first detection signal is different from a signal quantity of the capacitive sensing signal generated by the touch electrode receiving the second detection signal. Moreover, when the knob is at different gears, contact electrodes are at different positions, and overlapping areas between the contact electrodes and touch electrodes are different, which may also cause a difference between capacitive sensing signals of the touch electrode. Based on this, a detection unit may determine, according to signal quantities of the acquired capacitive sensing signals of the touch electrodes, whether the contact electrodes exist above the touch electrodes, then accurately determine positions of the contact electrodes, and determine a current gear of the knob according to the positions of the contact electrodes.

Additionally, if the knob is not normally bonded to the touch display panel, that is, the knob falls off, no capacitance is formed between the contact electrode and the touch electrode. Therefore, in the embodiments of the present disclosure, the capacitive sensing signals of the touch electrodes overlapping the contact electrodes are acquired so that whether the knob falls off can also be determined, so as to ensure the normal use of the knob.

In this embodiment, the detection signals are transmitted to the touch electrodes, and the positions of the contact electrodes are determined according to a difference between capacitive sensing signals sensed by the touch electrodes. The problems of a low quantity of the capacitive sensing signal and an abnormal quantity of the capacitive sensing signal in an extreme environment in the related art can be avoided, thereby improving determination accuracy of the gear of the knob, ensuring the normal application of the knob, and improving the reliability of the knob-type touch display device.

Figure 11:
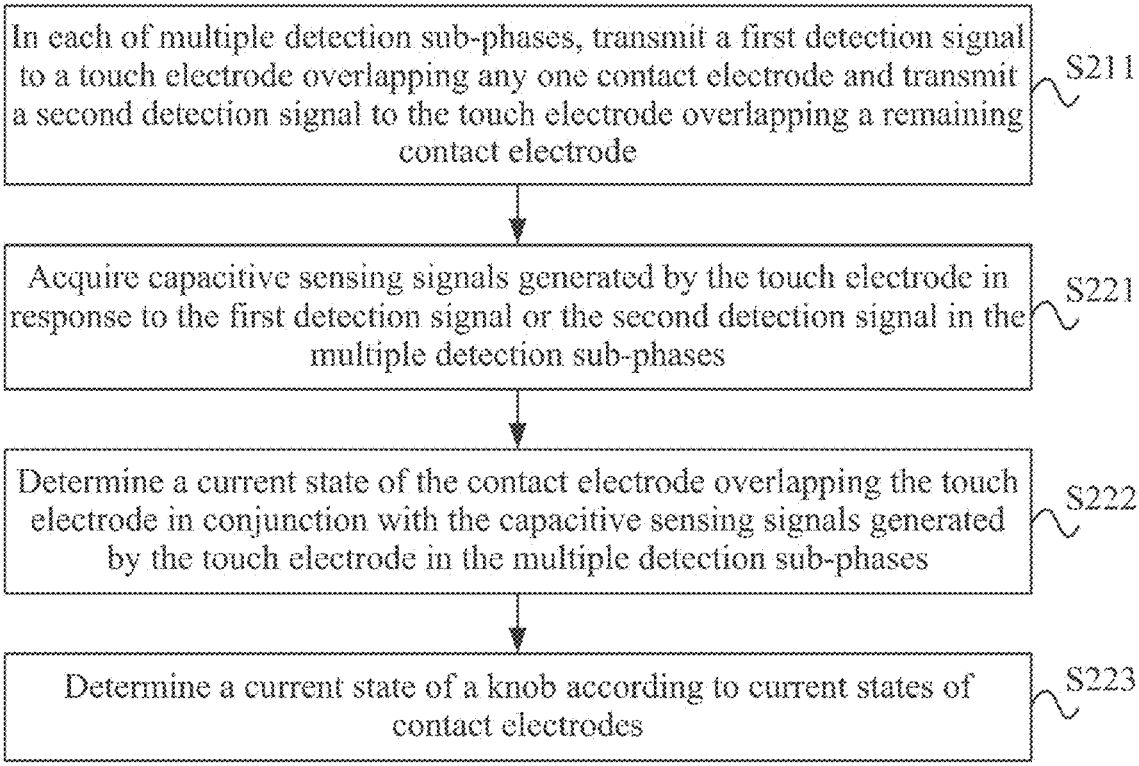
FIG. 11 is a flowchart of another detection method for a knob-type touch display device according to an embodiment of the present disclosure.

In an embodiment, FIG. 11 is a flowchart of another detection method for a knob-type touch display device according to an embodiment of the present disclosure. The embodiment shown in FIG. 11 is a further refinement based on the preceding embodiment. In this embodiment, the self-detection phase may include multiple detection sub-phases; S110 where in the self-detection phase, the first detection signal is transmitted to the touch electrode overlapping any one contact electrode and the second detection signal is transmitted to the touch electrode overlapping the remaining contact electrode in the preceding embodiment may be refined into S211. In S211, in each of the multiple detection sub-phases, the first detection signal is transmitted to the touch electrode overlapping any one contact electrode and the second detection signal is transmitted to the touch electrode overlapping the remaining contact electrode. S120 where the capacitive sensing signal generated by the touch electrode in response to the first detection signal or the second detection signal is acquired and the current state of the knob is determined according to the capacitive sensing signal in the preceding embodiment may be refined into S221, S222, and S223. In S221, capacitive sensing signals generated by the touch electrode in response to the first detection signal or the second detection signal in the multiple detection sub-phases are acquired. In S222, a current state of the contact electrode overlapping the touch electrode is determined in conjunction with the capacitive sensing signals generated by the touch electrode in the multiple detection sub-phases. In S223, the current state of the knob is determined according to current states of the contact electrodes.

Referring to FIG. 11, the detection method includes the steps below.

In S211, in each of the multiple detection sub-phases, the first detection signal is transmitted to the touch electrode overlapping any one contact electrode and the second detection signal is transmitted to the touch electrode overlapping the remaining contact electrode.

In different detection sub-phases, different touch electrodes receive the first detection signal. In each detection sub-phase, the touch electrode overlapping one contact electrode always exists to receive the first detection signal, and in different detection sub-phases, the detection unit transmits the first detection signal to the touch electrodes overlapping different contact electrodes.

In S221, the capacitive sensing signals generated by the touch electrode in response to the first detection signal or the second detection signal in the multiple detection sub-phases are acquired.

When the touch electrodes receive different detection signals, the touch electrodes and the contact electrodes generate different capacitive sensing signals in response to the detection signals, and the detection unit detects different signal quantities of the capacitive sensing signals of the touch electrodes. For the touch electrode overlapping a certain contact electrode, since the touch electrode receives different detection signals in different detection sub-phases, the touch electrode generates different capacitive sensing signals.

In S222, the current state of the contact electrode overlapping the touch electrode is determined in conjunction with the capacitive sensing signals generated by the touch electrode in the multiple detection sub-phases.

The detection unit may determine the current states of the contact electrodes in conjunction with capacitive sensing signals of the touch electrodes in the detection sub-phases. The detection unit may determine the states of the contact electrodes by comparing magnitudes of the capacitive sensing signals of different touch electrodes in the same detection sub-phase and/or magnitudes of the capacitive sensing signals of the same touch electrode in different detection sub-phases. The state of the contact electrode may include an installation state of the contact electrode and a position of the contact electrode.

In an embodiment, a comparison between capacitive sensing signals may be a comparison between signal quantities of the capacitive sensing signals or may be a comparison between digital signals corresponding to the capacitive sensing signals, which is not limited in the embodiment of the present disclosure. Any manner in which different capacitive sensing signals can be compared falls within the scope of the technical solutions protected in the embodiment of the present disclosure.

In S223, the current state of the knob is determined according to the current states of the contact electrodes.

The installation state of the contact electrode may reflect a bonding situation between the knob and the touch display panel, and the positions of the contact electrodes may reflect the current gear of the knob. Therefore, the detection unit is able to determine the current state of the knob according to the current states of the contact electrodes.

In this embodiment, the self-detection phase is divided into the multiple detection sub-phases, and the state of the knob is determined in conjunction with the capacitive sensing signals of the touch electrodes in the multiple detection sub-phases, thereby improving determination accuracy of the state of the knob.

In an embodiment, continued reference may be made to FIG. 5. In an exemplary embodiment, the knob 2 may further include multiple metal contacts 23 arranged at intervals along a circumferential direction of the knob; multiple contact electrodes 5 include a first contact electrode 51 and a second contact electrode 52, where the first contact electrode 51 and the second contact electrode 52 are arranged in a circle; during rotation of the knob 2, the first contact electrode 51 is always in electrical contact with at least one of the multiple metal contacts 23, and the second contact electrode 52 is in electrical contact with or disconnected from a metal contact 23 so that the first contact electrode 51 is connected to or disconnected from the second contact electrode 52 through the multiple metal contacts 23; and multiple touch electrodes 4 include a first touch electrode 41 and a second touch electrode 42, where along a direction perpendicular to a plane where the touch display panel 1 is located, the first touch electrode 41 overlaps the first contact electrode 51, and the second touch electrode 42 overlaps the second contact electrode 52. For the specific structure of the knob, reference may be made to the preceding embodiments, and the details are not repeated here. Different states in which the first contact electrode 51 is in contact with or disconnected from the second contact electrode 52 may reflect the gear of the knob 2. Based on the preceding structure of the knob 2, in some embodiments, S222 where the current state of the contact electrode overlapping the touch electrode is determined in conjunction with the capacitive sensing signals generated by the touch electrode in the multiple detection sub-phases in the preceding embodiments may be refined into S322. In S322, a connection state between the second contact electrode and the first contact electrode is determined according to a comparison result of capacitive sensing signals generated by the first touch electrode and the second touch electrode in the multiple detection sub-phases. S223 where the current state of the knob is determined according to the current states of the contact electrodes may be refined into S323. In S323, a current gear state of the knob is determined according to the connection state between the second contact electrode and the first contact electrode.

Figure 12:
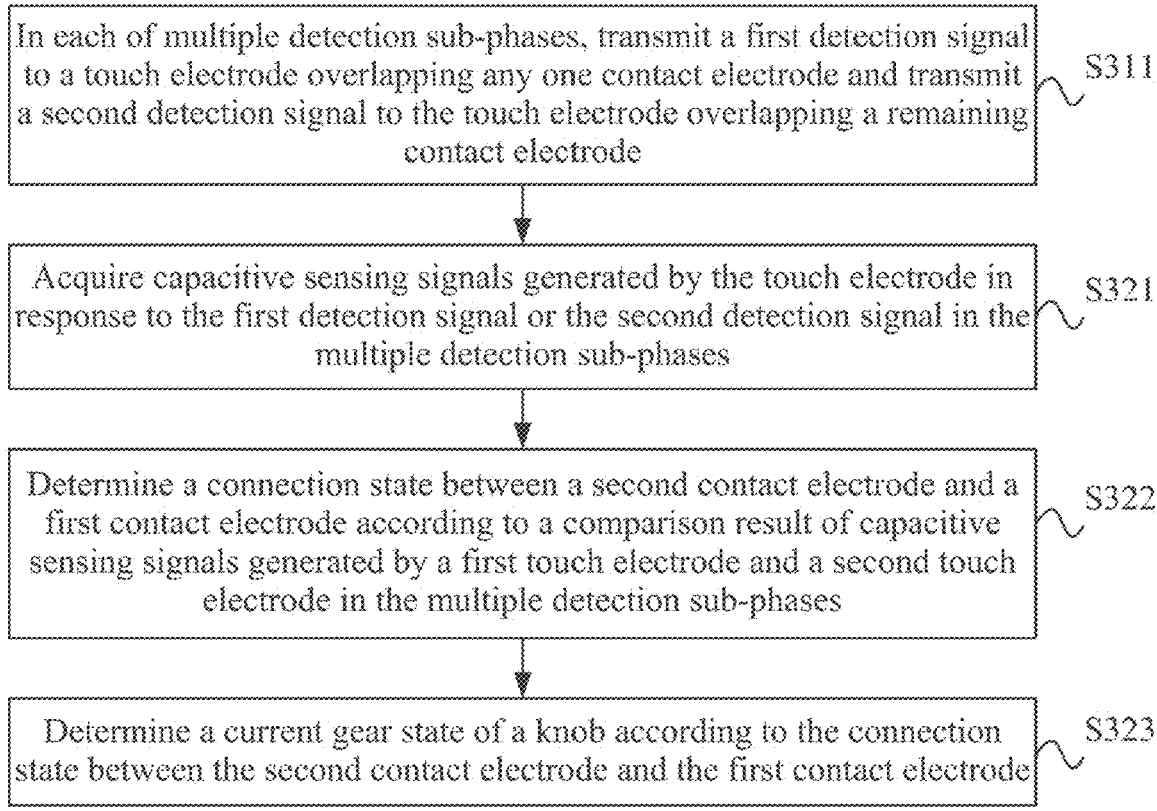
FIG. 12 is a flowchart of another detection method for a knob-type touch display device according to an embodiment of the present disclosure.

FIG. 12 is a flowchart of another detection method for a knob-type touch display device according to an embodiment of the present disclosure. Referring to FIG. 12, the detection method includes the steps below.

In S311, in each of the multiple detection sub-phases, the first detection signal is transmitted to the touch electrode overlapping any one contact electrode and the second detection signal is transmitted to the touch electrode overlapping the remaining contact electrode.

In different detection sub-phases, different touch electrodes receive the first detection signal.

In S321, the capacitive sensing signals generated by the touch electrode in response to the first detection signal or the second detection signal in the multiple detection sub-phases are acquired.

For specific manners of the preceding steps, reference may be made to the preceding embodiment, and the details are not repeated here.

In S322, the connection state between the second contact electrode and the first contact electrode is determined according to the comparison result of the capacitive sensing signals generated by the first touch electrode and the second touch electrode in the multiple detection sub-phases.

In S323, the current gear state of the knob is determined according to the connection state between the second contact electrode and the first contact electrode.

In an embodiment, referring to FIGS. 4 and 5, in one detection sub-phase, the first detection signal is transmitted to the first touch electrode 41 overlapping the first contact electrode 51, and the second detection signal is transmitted to the second touch electrode 42 overlapping the second contact electrode 52; and in another detection sub-phase, the first detection signal is transmitted to the second touch electrode 42 overlapping the second contact electrode 52, and the second detection signal is transmitted to the first touch electrode 41 overlapping the first contact electrode 51. Assuming that the first contact electrode 51 is in contact with the second contact electrode 52, in a first detection sub-phase, the capacitive sensing signal fed back by the first touch electrode 41 is similar to or the same as the capacitive sensing signal fed back by the second touch electrode 42; and in a second detection sub-phase, the capacitive sensing signal fed back by the first touch electrode 41 is similar to or the same as the capacitive sensing signal fed back by the second touch electrode 42. Moreover, the capacitive sensing signal fed back by the second touch electrode 42 in the first detection sub-phase is similar to or the same as the capacitive sensing signal fed back by the second touch electrode 42 in the second detection sub-phase. Assuming that the first contact electrode 51 is disconnected from the second contact electrode 52, in the first detection sub-phase, the capacitive sensing signal fed back by the first touch electrode 41 has a relatively large difference from the capacitive sensing signal fed back by the second touch electrode 42; and in the second detection sub-phase, the capacitive sensing signal fed back by the first touch electrode 41 has a relatively large difference from the capacitive sensing signal fed back by the second touch electrode 42. Moreover, the capacitive sensing signal fed back by the second touch electrode 42 in the first detection sub-phase has a relatively large difference from the capacitive sensing signal fed back by the second touch electrode 42 in the second detection sub-phase. Therefore, the detection unit 3 may determine the connection state between the second contact electrode 52 and the first contact electrode 51 according to the capacitive sensing signals generated by the first touch electrode 41 and the second touch electrode 42 in the detection sub-phases and determine the current gear of the knob 2 according to the connection state between the second contact electrode 52 and the first contact electrode 51.

In this embodiment, the connection state between the contact electrodes is determined in conjunction with the comparison result of the capacitive sensing signals of the touch electrodes in the multiple detection sub-phases, which can reduce an effect of an ambient environment and improve gear detection accuracy.

For example, S322 where the connection state between the second contact electrode and the first contact electrode is determined according to the comparison result of the capacitive sensing signals generated by the first touch electrode and the second touch electrode in the multiple detection sub-phases in the preceding embodiment may be refined into step one and step two. In step one, according to a comparison result of capacitive sensing signals generated by the first touch electrode and the second touch electrode in the same detection sub-phase, a connection sub-state between the second contact electrode and the first contact electrode in the detection sub-phase is determined. In step two, the connection state between the second contact electrode and the first contact electrode is determined in conjunction with connection sub-states between the second contact electrode and the first contact electrode in different detection sub-phases.

In an embodiment, in this embodiment, the detection unit may compare magnitudes of the capacitive sensing signals generated by the first touch electrode and the second touch electrode in the same detection sub-phase and obtain a connection situation (that is, the connection sub-state) between the first contact electrode and the second contact electrode in the detection sub-phase according to the comparison result. It is to be understood that one connection sub-state between the first contact electrode and the second contact electrode may be determined in each detection sub-phase, and the detection unit may obtain a determination result of the final connection state in conjunction with multiple connection sub-states separately determined in the multiple detection sub-phases.

For example, continued reference may be made to FIGS. 4 and 5. In an exemplary embodiment, the second contact electrode 52 may include a first contact sub-electrode 521 and a second contact sub-electrode 522, and the second touch electrode 42 includes a first touch sub-electrode 421 and a second touch sub-electrode 422; where along the direction perpendicular to the plane where the touch display panel 1 is located, the first contact sub-electrode 521 overlaps the first touch sub-electrode 421, and the second contact sub-electrode 522 overlaps the second touch sub-electrode 422. The self-detection phase includes a first detection sub-phase, a second detection sub-phase, and a third detection sub-phase. S311 where in each of the multiple detection sub-phases, the first detection signal is transmitted to the touch electrode overlapping any one contact electrode and the second detection signal is transmitted to the touch electrode overlapping the remaining contact electrode in the preceding embodiment may be refined into the following: in the first detection sub-phase, the first detection signal is transmitted to the first touch electrode and the second detection signal is transmitted to the first touch sub-electrode and the second touch sub-electrode; in the second detection sub-phase, the first detection signal is transmitted to the first touch sub-electrode and the second detection signal is transmitted to the first touch electrode and the second touch sub-electrode; and in the third detection sub-phase, the first detection signal is transmitted to the second touch sub-electrode and the second detection signal is transmitted to the first touch electrode and the first touch sub-electrode. S321 where the capacitive sensing signals generated by the touch electrode in response to the first detection signal or the second detection signal in the multiple detection sub-phases are acquired in the preceding embodiment may be refined into the following: in the first detection sub-phase, a seventh capacitive sensing signal generated by the first touch electrode, a first capacitive sensing signal generated by the first touch sub-electrode, and a second capacitive sensing signal generated by the second touch sub-electrode are acquired; in the second detection sub-phase, an eighth capacitive sensing signal generated by the first touch electrode, a third capacitive sensing signal generated by the first touch sub-electrode, and a fourth capacitive sensing signal generated by the second touch sub-electrode are acquired; and in the third detection sub-phase, a ninth capacitive sensing signal generated by the first touch electrode, a fifth capacitive sensing signal generated by the first touch sub-electrode, and a sixth capacitive sensing signal generated by the second touch sub-electrode are acquired.

In an embodiment, step one where according to the comparison result of the capacitive sensing signals generated by the first touch electrode and the second touch electrode in the same detection sub-phase, the connection sub-state between the second contact electrode and the first contact electrode in the detection sub-phase is determined in the preceding embodiment may be refined into the following: in the first detection sub-phase, a connection sub-state between the first contact electrode and the first contact sub-electrode is determined according to a comparison result of the first capacitive sensing signal and the seventh capacitive sensing signal, and a connection sub-state between the first contact electrode and the second contact sub-electrode is determined according to a comparison result of the second capacitive sensing signal and the seventh capacitive sensing signal; in the second detection sub-phase, a connection sub-state between the first contact electrode and the first contact sub-electrode is determined according to a comparison result of the third capacitive sensing signal and the eighth capacitive sensing signal, and a connection sub-state between the first contact electrode and the second contact sub-electrode is determined according to a comparison result of the fourth capacitive sensing signal and the eighth capacitive sensing signal; and in the third detection sub-phase, a connection sub-state between the first contact electrode and the first contact sub-electrode is determined according to a comparison result of the fifth capacitive sensing signal and the ninth capacitive sensing signal, and a connection sub-state between the first contact electrode and the second contact sub-electrode is determined according to a comparison result of the sixth capacitive sensing signal and the ninth capacitive sensing signal. Step two where the connection state between the second contact electrode and the first contact electrode is determined in conjunction with the connection sub-states between the second contact electrode and the first contact electrode in different detection sub-phases may be refined into the following: a connection state between the first contact electrode and the first contact sub-electrode is determined in conjunction with connection sub-states between the first contact electrode and the first contact sub-electrode in different detection sub-phases, and a connection state between the first contact electrode and the second contact sub-electrode is determined in conjunction with connection sub-states between the first contact electrode and the second contact sub-electrode in different detection sub-phases.

For example, it is assumed that a digital signal corresponding to the capacitive sensing signal generated by the touch electrode in response to the first detection signal is 0, and a digital signal corresponding to the capacitive sensing signal generated by the touch electrode in response to the second detection signal is 1. In the first detection sub-phase, if the detection unit acquires that the seventh capacitive sensing signal, the first capacitive sensing signal, and the second capacitive sensing signal correspond to 0, 0, and 1, respectively, it may be determined that the first contact electrode is connected to the first contact sub-electrode and disconnected from the second contact sub-electrode. In the second detection sub-phase, if the detection unit acquires that the eighth capacitive sensing signal, the third capacitive sensing signal, and the fourth capacitive sensing signal correspond to 0, 0, and 1, respectively, it may be determined that the first contact electrode is connected to the first contact sub-electrode and disconnected from the second contact sub-electrode. In the third detection sub-phase, if the detection unit acquires that the ninth capacitive sensing signal, the fifth capacitive sensing signal, and the sixth capacitive sensing signal correspond to 1, 1, and 0, respectively, it may also be obtained that the first contact electrode is connected to the first contact sub-electrode and disconnected from the second contact sub-electrode. The connection sub-states determined in the three detection sub-phases are the same, and it may be determined in conjunction with the three connection sub-states that the first contact sub-electrode is connected to the first contact electrode and the second contact sub-electrode is disconnected from the first contact electrode. Therefore, it is determined that the knob is in the second connection state shown in FIG. 6.

In an embodiment, in other embodiments, for the structure of the knob, reference may still be made to FIGS. 4 and 5, and the multiple detection sub-phases include the first detection sub-phase, the second detection sub-phase, and the third detection sub-phase. S311 where in each of the multiple detection sub-phases, the first detection signal is transmitted to the touch electrode overlapping any one contact electrode and the second detection signal is transmitted to the touch electrode overlapping the remaining contact electrode in the preceding embodiment may be refined into the following: in the first detection sub-phase, the first detection signal is transmitted to the first touch electrode and the second detection signal is transmitted to the first touch sub-electrode and the second touch sub-electrode; in the second detection sub-phase, the first detection signal is transmitted to the first touch sub-electrode and the second detection signal is transmitted to the first touch electrode and the second touch sub-electrode; and in the third detection sub-phase, the first detection signal is transmitted to the second touch sub-electrode and the second detection signal is transmitted to the first touch electrode and the first touch sub-electrode. S321 where the capacitive sensing signals generated by the touch electrode in response to the first detection signal or the second detection signal in the multiple detection sub-phases are acquired in the preceding embodiment may be refined into the following: in the first detection sub-phase, the first capacitive sensing signal generated by the first touch sub-electrode and the second capacitive sensing signal generated by the second touch sub-electrode are acquired; in the second detection sub-phase, the third capacitive sensing signal generated by the first touch sub-electrode and the fourth capacitive sensing signal generated by the second touch sub-electrode are acquired; and in the third detection sub-phase, the fifth capacitive sensing signal generated by the first touch sub-electrode and the sixth capacitive sensing signal generated by the second touch sub-electrode are acquired. S322 where the connection state between the second contact electrode and the first contact electrode is determined according to the comparison result of the capacitive sensing signals generated by the first touch electrode and the second touch electrode in the multiple detection sub-phases in the preceding embodiment may be refined into the following: the connection state between the first contact sub-electrode and the first contact electrode is determined according to a comparison result of the first capacitive sensing signal and the third capacitive sensing signal and/or a comparison result of the fifth capacitive sensing signal and the third capacitive sensing signal; and the connection state between the second contact sub-electrode and the first contact electrode is determined according to a comparison result of the second capacitive sensing signal and the sixth capacitive sensing signal and/or a comparison result of the fourth capacitive sensing signal and the sixth capacitive sensing signal. S323 where the current gear state of the knob is determined according to the connection state between the second contact electrode and the first contact electrode may be refined into the following: the current gear state of the knob is determined according to the connection state between the first contact sub-electrode and the first contact electrode and the connection state between the second contact sub-electrode and the first contact electrode.

In this embodiment, a contact state of the contact electrode corresponding to the touch electrode may be determined according to comparison results of the capacitive sensing signal in the detection sub-phase where the touch electrode receives the first detection signal and capacitive sensing signals in the other two detection sub-phases.

For example, for the first touch sub-electrode, the capacitive sensing signals (that is, the first capacitive sensing signal and the third capacitive sensing signal) of the first touch sub-electrode in the first detection sub-phase and the second detection sub-phase may be compared to obtain the comparison result, and/or the capacitive sensing signals (that is, the fifth capacitive sensing signal and the third capacitive sensing signal) of the first touch sub-electrode in the second detection sub-phase and the third detection sub-phase may be compared to obtain the comparison result. For the second touch sub-electrode, the capacitive sensing signals (that is, the second capacitive sensing signal and the sixth capacitive sensing signal) of the second touch sub-electrode in the first detection sub-phase and the third detection sub-phase may be compared to obtain the comparison result, and/or the capacitive sensing signals (that is, the fourth capacitive sensing signal and the sixth capacitive sensing signal) of the second touch sub-electrode in the second detection sub-phase and the third detection sub-phase may be compared to obtain the comparison result.

Since the first detection signal is different from the second detection signal, the comparison result of the first capacitive sensing signal and the third capacitive sensing signal (or the fifth capacitive sensing signal and the third capacitive sensing signal) is different when the first contact sub-electrode is connected to or disconnected from the first contact electrode. Therefore, the first capacitive sensing signal and the third capacitive sensing signal (or the fifth capacitive sensing signal and the third capacitive sensing signal) may be compared so that whether the first contact sub-electrode is connected to the first contact electrode currently is determined. Similarly, the comparison result of the second capacitive sensing signal and the sixth capacitive sensing signal (or the fourth capacitive sensing signal and the sixth capacitive sensing signal) is different when the second contact sub-electrode is connected to or disconnected from the first contact electrode. Therefore, the second capacitive sensing signal and the sixth capacitive sensing signal (or the fourth capacitive sensing signal and the sixth capacitive sensing signal) may be compared so that whether the second contact sub-electrode is connected to the first contact electrode currently is determined.

In an embodiment, in some embodiments, the step where the connection state between the first contact sub-electrode and the first contact electrode is determined according to the comparison result of the first capacitive sensing signal and the third capacitive sensing signal and/or the comparison result of the fifth capacitive sensing signal and the third capacitive sensing signal may be further refined into the following: in the case where a difference between the first capacitive sensing signal and the third capacitive sensing signal is less than a first reference value and/or a difference between the fifth capacitive sensing signal and the third capacitive sensing signal is less than the first reference value, it is determined that the first contact sub-electrode is connected to the first contact electrode; and in the case where the difference between the first capacitive sensing signal and the third capacitive sensing signal is greater than or equal to the first reference value and/or the difference between the fifth capacitive sensing signal and the third capacitive sensing signal is greater than or equal to the first reference value, it is determined that the first contact sub-electrode is disconnected from the first contact electrode. The step where the connection state between the second contact sub-electrode and the first contact electrode is determined according to the comparison result of the second capacitive sensing signal and the sixth capacitive sensing signal and/or the comparison result of the fourth capacitive sensing signal and the sixth capacitive sensing signal may be further refined into the following: in the case where a difference between the second capacitive sensing signal and the sixth capacitive sensing signal is less than a second reference value and/or a difference between the fourth capacitive sensing signal and the sixth capacitive sensing signal is less than the second reference value, it is determined that the second contact sub-electrode is connected to the first contact electrode; and in the case where the difference between the second capacitive sensing signal and the sixth capacitive sensing signal is greater than or equal to the second reference value and/or the difference between the fourth capacitive sensing signal and the sixth capacitive sensing signal is greater than or equal to the second reference value, it is determined that the second contact sub-electrode is disconnected from the first contact electrode.

Assuming that the first contact sub-electrode is in contact with the first contact electrode, when the first touch sub-electrode receives the first detection signal and the first touch electrode receives the second detection signal, the capacitive sensing signal generated by the first touch sub-electrode in response to the first detection signal is affected by the second detection signal; when the first touch sub-electrode receives the second detection signal and the first touch electrode receives the first detection signal, the capacitive sensing signal generated by the first touch sub-electrode in response to the second detection signal is affected by the first detection signal. The first capacitive sensing signal and the third capacitive sensing signal (or the fifth capacitive sensing signal and the third capacitive sensing signal) may be similar or even the same in signal quantity. Assuming that the first contact sub-electrode is disconnected from the first contact electrode, when the first touch sub-electrode receives the first detection signal and the first touch electrode receives the second detection signal, the capacitive sensing signal generated by the first touch sub-electrode in response to the first detection signal is not affected by the second detection signal and is a separate capacitive sensing signal corresponding to the first detection signal; when the first touch sub-electrode receives the second detection signal and the first touch electrode receives the first detection signal, the capacitive sensing signal generated by the first touch sub-electrode in response to the second detection signal is not affected by the first detection signal. The first capacitive sensing signal and the third capacitive sensing signal (or the fifth capacitive sensing signal and the third capacitive sensing signal) should have a relatively large difference in signal quantity.

In this embodiment, the first reference value may be preset according to an actual test, and the first reference value is a critical value. When the difference between the first capacitive sensing signal and the third capacitive sensing signal (and/or the fifth capacitive sensing signal and the third capacitive sensing signal) in signal quantity is less than the first reference value, it is determined that the first contact sub-electrode is in contact with the first contact electrode; on the contrary, it is determined that the first contact sub-electrode is disconnected from the first contact electrode.

Assuming that the second contact sub-electrode is in contact with the first contact electrode, when the second touch sub-electrode receives the first detection signal and the first touch electrode receives the second detection signal, the capacitive sensing signal generated by the second touch sub-electrode in response to the first detection signal is affected by the second detection signal; when the second touch sub-electrode receives the second detection signal and the first touch electrode receives the first detection signal, the capacitive sensing signal generated by the second touch sub-electrode in response to the second detection signal is not affected by the first detection signal and is a separate capacitive sensing signal corresponding to the second detection signal. The second capacitive sensing signal and the sixth capacitive sensing signal (or the fourth capacitive sensing signal and the sixth capacitive sensing signal) may be similar or even the same in signal quantity. Assuming that the second contact sub-electrode is disconnected from the first contact electrode, when the second touch sub-electrode receives the first detection signal and the first touch electrode receives the second detection signal, the capacitive sensing signal generated by the second touch sub-electrode in response to the first detection signal is not affected by the second detection signal and is a separate capacitive sensing signal corresponding to the first detection signal; when the second touch sub-electrode receives the second detection signal and the first touch electrode receives the first detection signal, the capacitive sensing signal generated by the second touch sub-electrode in response to the second detection signal is not affected by the first detection signal and is a separate capacitive sensing signal corresponding to the second detection signal. The second capacitive sensing signal and the sixth capacitive sensing signal (or the fourth capacitive sensing signal and the sixth capacitive sensing signal) should have a relatively large difference in signal quantity. Therefore, the second capacitive sensing signal and the sixth capacitive sensing signal (or the fourth capacitive sensing signal and the sixth capacitive sensing signal) may be compared so that whether the second contact sub-electrode is in contact with the first contact electrode currently is determined.

In this embodiment, the second reference value may be preset according to an actual test, and the second reference value is a critical value. When the difference between the second capacitive sensing signal and the sixth capacitive sensing signal (and/or the fourth capacitive sensing signal and the sixth capacitive sensing signal) in signal quantity is less than the second reference value, it is determined that the second contact sub-electrode is in contact with the first contact electrode; on the contrary, it is determined that the second contact sub-electrode is disconnected from the first contact electrode.

Figure 13:
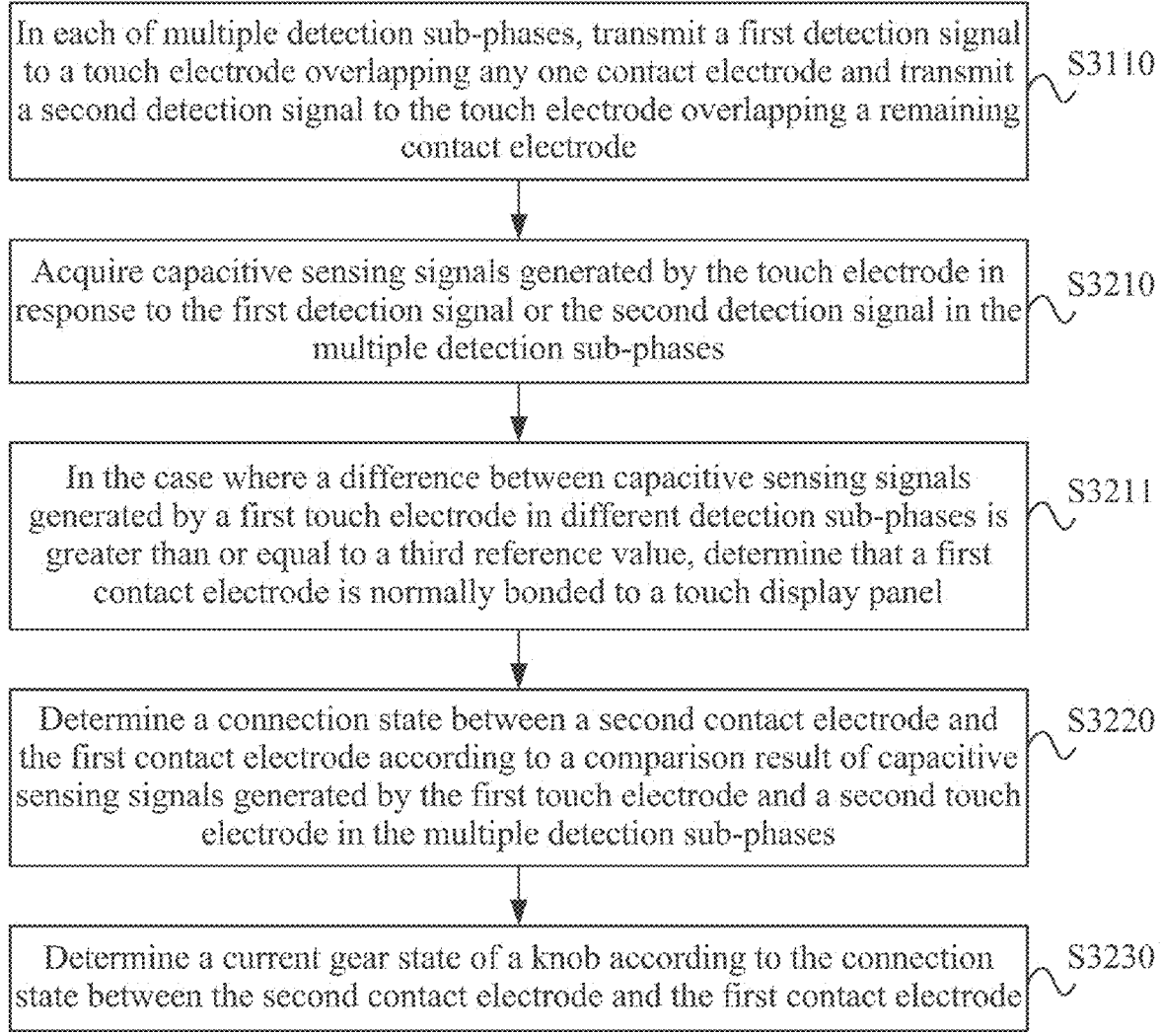
FIG. 13 is a flowchart of another detection method for a knob-type touch display device according to an embodiment of the present disclosure.

FIG. 13 is a flowchart of another detection method for a knob-type touch display device according to an embodiment of the present disclosure. In the embodiment shown in FIG. 13, S3211 may also be performed before S322 where the connection state between the second contact electrode and the first contact electrode is determined according to the comparison result of the capacitive sensing signals generated by the first touch electrode and the second touch electrode in the multiple detection sub-phases in the preceding embodiment. In S3211, in the case where a difference between capacitive sensing signals generated by the first touch electrode in different detection sub-phases is greater than or equal to a third reference value, it is determined that the first contact electrode is normally bonded to the touch display panel.

Referring to FIG. 13, the detection method in this embodiment includes the steps below.

In S3110, in each of the multiple detection sub-phases, the first detection signal is transmitted to the touch electrode overlapping any one contact electrode and the second detection signal is transmitted to the touch electrode overlapping the remaining contact electrode.

In different detection sub-phases, different touch electrodes receive the first detection signal.

In S3210, the capacitive sensing signals generated by the touch electrode in response to the first detection signal or the second detection signal in the multiple detection sub-phases are acquired.

For specific manners of the preceding steps, reference may be made to the preceding embodiment, and the details are not repeated here.

In S3211, in the case where the difference between the capacitive sensing signals generated by the first touch electrode in the different detection sub-phases is greater than or equal to the third reference value, it is determined that the first contact electrode is normally bonded to the touch display panel.

In S3220, the connection state between the second contact electrode and the first contact electrode is determined according to the comparison result of the capacitive sensing signals generated by the first touch electrode and the second touch electrode in the multiple detection sub-phases.

In S3230, the current gear state of the knob is determined according to the connection state between the second contact electrode and the first contact electrode.

Three contact electrodes of the knob are bonded to the touch display panel in the form of iron sheets, the first contact electrode is used as a ground contact electrode, and a bonding situation between the first contact electrode and the touch display panel directly affects the subsequent normal application of the knob. Therefore, this embodiment proposes that before the gear of the knob is determined, whether the first contact electrode is normally bonded to the touch display panel may be determined, and in the case of normal bonding, the gear of the knob is determined subsequently.

In an embodiment, if the first contact electrode is normally bonded to the touch display panel, in different detection sub-phases, since the first touch electrode receives different detection signals, the capacitive sensing signals fed back by the first touch electrode should have a certain difference in signal quantity. On this basis, in this embodiment, the third reference value may be preset according to an actual test. When the difference between the capacitive sensing signals generated by the first touch electrode in the different detection sub-phases is greater than or equal to the third reference value, it is determined that the first contact electrode is normally bonded to the touch display panel. The detection unit normally performs the subsequent detection of the gear of the knob.

For example, the determination of a normal bonding state of the first contact electrode is further described below in conjunction with the specific structure of the knob. Still referring to FIGS. 4 and 5, the second contact electrode 52 includes the first contact sub-electrode 521 and the second contact sub-electrode 522, and the second touch electrode 42 includes the first touch sub-electrode 421 and the second touch sub-electrode 422; where along the direction perpendicular to the plane where the touch display panel is located, the first contact electrode overlaps the first touch electrode, the first contact sub-electrode 521 overlaps the first touch sub-electrode 421, and the second contact sub-electrode 522 overlaps the second touch sub-electrode 422. The self-detection phase includes the first detection sub-phase, the second detection sub-phase, and the third detection sub-phase. S3110 where in each of the multiple detection sub-phases, the first detection signal is transmitted to the touch electrode overlapping any one contact electrode and the second detection signal is transmitted to the touch electrode overlapping the remaining contact electrode in the preceding embodiment may be refined into the following: in the first detection sub-phase, the first detection signal is transmitted to the first touch electrode and the second detection signal is transmitted to the first touch sub-electrode and the second touch sub-electrode; in the second detection sub-phase, the first detection signal is transmitted to the first touch sub-electrode and the second detection signal is transmitted to the first touch electrode and the second touch sub-electrode; in the third detection sub-phase, the first detection signal is transmitted to the second touch sub-electrode and the second detection signal is transmitted to the first touch electrode and the first touch sub-electrode. S3210 where the capacitive sensing signals generated by the touch electrode in response to the first detection signal or the second detection signal in the multiple detection sub-phases are acquired in the preceding embodiment may also include the following: in the first detection sub-phase, the seventh capacitive sensing signal generated by the first touch electrode is acquired; in the second detection sub-phase, the eighth capacitive sensing signal generated by the first touch electrode is acquired; and in the third detection sub-phase, the ninth capacitive sensing signal generated by the first touch electrode is acquired. S3211 where in the case where the difference between the capacitive sensing signals generated by the first touch electrode in the different detection sub-phases is greater than or equal to the third reference value, it is determined that the first contact electrode is normally bonded to the touch display panel in the preceding embodiment may also include the following: in the case where a difference between the eighth capacitive sensing signal and the seventh capacitive sensing signal is greater than or equal to the third reference value and/or a difference between the ninth capacitive sensing signal and the seventh capacitive sensing signal is greater than or equal to the third reference value, it is determined that the first contact electrode is normally bonded to the touch display panel.

In this embodiment, the self-detection phase may still include three detection sub-phases. In each detection sub-phase, a specific manner in which the detection unit sends the detection signals and receives the capacitive sensing signals is the same as that in the preceding embodiments, and the details are not repeated here. A manner of determining a bonding state of the first contact electrode is mainly described in this embodiment.

In an embodiment, in the first detection sub-phase, the detection unit acquires the seventh capacitive sensing signal fed back by the first touch electrode in response to the first detection signal; in the second detection sub-phase, the detection unit acquires the eighth capacitive sensing signal generated by the first touch electrode in response to the second detection signal; and in the third detection sub-phase, the detection unit acquires the ninth capacitive sensing signal generated by the first touch electrode in response to the second detection signal.

The bonding state of the first contact electrode is determined according to the comparison result of the capacitive sensing signal (the seventh capacitive sensing signal) in the detection sub-phase where the first touch electrode receives the first detection signal and the capacitive sensing signal (the eighth capacitive sensing signal or the ninth capacitive sensing signal) in each of the other two detection sub-phases. In an embodiment, if the difference between the eighth capacitive sensing signal and the seventh capacitive sensing signal is greater than or equal to the third reference value and/or the difference between the ninth capacitive sensing signal and the seventh capacitive sensing signal is greater than or equal to the third reference value, it may be determined that the first contact electrode is normally bonded to the touch display panel.

In an embodiment, based on the preceding embodiments, the present disclosure further proposes that in some embodiments, the detection method for a knob-type touch display device may further include the following: in the case where the difference between the eighth capacitive sensing signal and the seventh capacitive sensing signal is less than the third reference value and/or the difference between the ninth capacitive sensing signal and the seventh capacitive sensing signal is less than the third reference value, it is determined that the first contact electrode is abnormally bonded to the touch display panel; and an alarm for an abnormal bonding state is sent.

As can be seen from the preceding analysis, if the capacitive sensing signals fed back by the first touch electrode in the different detection sub-phases where different detection signals are received have a very small difference or are even similar in signal quantity, it indicates that the first contact electrode may not be normally bonded to the touch display panel, that is, the first contact electrode falls off. On this basis, this embodiment proposes that when the difference between the eighth capacitive sensing signal and the seventh capacitive sensing signal is less than the third reference value and/or the difference between the ninth capacitive sensing signal and the seventh capacitive sensing signal is less than the third reference value, the detection unit may determine that the first contact electrode is abnormally bonded and send the alarm for the abnormal bonding state. In this manner, a user is reminded that the knob may fall off and is informed of timely maintenance.

The alarm for the abnormal bonding state may be sent through a display interface of the display device and/or a speaker connected to the display panel, which is neither described in detail nor limited in the embodiments of the present disclosure.

Specific values of the first reference value, the second reference value, and the third reference value in the preceding embodiments are not limited and may be set by those skilled in the art according to actual requirements.

In an embodiment, digital signals corresponding to the capacitive sensing signals are compared, for example. In other embodiments, if the seventh capacitive sensing signal, the eighth capacitive sensing signal, and the ninth capacitive sensing signal acquired by the detection unit in the first detection sub-phase, the second detection sub-phase, and the third detection sub-phase are all 1, it indicates that the first touch electrode feeds back unchanged capacitive sensing signals regardless of the detection signals received. In this case, the detection unit may determine that the first contact electrode is abnormally bonded.

In an embodiment, at least one of the multiple detection sub-phases is repeatedly executed, and a repeatedly executed detection sub-phase is a repetitive detection sub-phase; and S221 where the capacitive sensing signals generated by the touch electrode in response to the first detection signal or the second detection signal in the multiple detection sub-phases are acquired in the preceding embodiment may include the following: a first capacitive sensing sub-signal generated by the touch electrode in response to the first detection signal or the second detection signal in the same repetitive detection sub-phase is acquired; and a capacitive sensing signal of the touch electrode in the repetitive detection sub-phase is determined in conjunction with first capacitive sensing sub-signals.

Repeated execution of a detection sub-phase means that in the self-detection phase, the detection sub-phase is performed at least twice. In two repetitive detection sub-phases that are the same, the same touch electrode receives the first detection signal and the same touch electrode receives the second detection signal. The two repetitive detection sub-phases that are the same may be considered as the same detection sub-phase rather than different detection sub-phases.

The detection unit acquires the capacitive sensing signals of the touch electrode in the detection sub-phases, and a capacitive sensing signal fed back by the touch electrode in the repetitive detection sub-phase may be defined as the first capacitive sensing sub-signal. The detection unit may superimpose or average the first capacitive sensing sub-signals fed back by the same touch electrode in the same repetitive detection sub-phases to obtain the capacitive sensing signal of the touch electrode in the same detection sub-phase.

For example, the self-detection phase may include two first detection sub-phases, two second detection sub-phases, and two third detection sub-phases proposed in the preceding embodiments. In this case, the first detection sub-phase, the second detection sub-phase, and the third detection sub-phase are all repetitive detection sub-phases, and the self-detection phase includes six detection sub-phases in total. The detection unit acquires, in each detection sub-phase, first capacitive sensing sub-signals fed back by the touch electrodes, determines the first capacitive sensing signal of the first touch sub-electrode in conjunction with first capacitive sensing sub-signals fed back by the first touch sub-electrode in the two first detection sub-phases, determines the second capacitive sensing signal of the second touch sub-electrode in conjunction with first capacitive sensing sub-signals fed back by the second touch sub-electrode in the two first detection sub-phases, determines the third capacitive sensing signal of the first touch sub-electrode in conjunction with first capacitive sensing sub-signals fed back by the first touch sub-electrode in the two second detection sub-phases, determines the fourth capacitive sensing signal of the second touch sub-electrode in conjunction with first capacitive sensing sub-signals fed back by the second touch sub-electrode in the two second detection sub-phases, determines the fifth capacitive sensing signal of the first touch sub-electrode in conjunction with first capacitive sensing sub-signals fed back by the first touch sub-electrode in the two third detection sub-phases, determines the sixth capacitive sensing signal of the second touch sub-electrode in conjunction with first capacitive sensing sub-signals fed back by the second touch sub-electrode in the two third detection sub-phases, determines the seventh capacitive sensing signal of the first touch electrode in conjunction with first capacitive sensing sub-signals fed back by the first touch electrode in the two first detection sub-phases, determines the eighth capacitive sensing signal of the first touch electrode in conjunction with first capacitive sensing sub-signals fed back by the first touch electrode in the two second detection sub-phases, and determines the ninth capacitive sensing signal of the first touch electrode in conjunction with first capacitive sensing sub-signals fed back by the first touch electrode in the two third detection sub-phases.

The repetitive detection sub-phase is set, and the capacitive sensing signal of the touch electrode in the same detection sub-phase is determined in conjunction with the first capacitive sensing sub-signals fed back by the touch electrode in the same repetitive detection sub-phases so that the problem of a quantity deviation of the capacitive sensing signal due to the extreme environment can be further avoided, acquisition accuracy of the capacitive sensing signal can be improved, and accuracy of a detection result of the state of the knob can be improved.

It is to be noted that the number of repetitive detection sub-phases in the self-detection phase may be set according to actual requirements and is not limited to the example in the preceding embodiment. For example, in other embodiments, the self-detection phase may include one first detection sub-phase, two second detection sub-phases, and two third detection sub-phases, the self-detection phase may include three first detection sub-phases, three second detection sub-phases, and three third detection sub-phases, or the like, which are not described one by one in the present disclosure.

In an embodiment, continued reference may be made to FIG. 7. along the direction perpendicular to the plane where the touch display panel is located, one touch electrode 4 overlaps one contact electrode 5, and a projection of the touch electrode 4 on the plane where the touch display panel is located covers a projection of the contact electrode 5 on the plane where the touch display panel is located. S211 where in each of the multiple detection sub-phases, the first detection signal is transmitted to the touch electrode overlapping any one contact electrode and the second detection signal is transmitted to the touch electrode overlapping the remaining contact electrode in the preceding embodiment may be refined into the following: in each of the multiple detection sub-phases, the first detection signal is transmitted to one touch electrode overlapping any one contact electrode and the second detection signal is transmitted to the touch electrode overlapping the remaining contact electrode.

Compared with a touch electrode not overlapping the contact electrode, the touch electrode overlapping the contact electrode has a larger area so that the signal quantity of the capacitive sensing signal of the touch electrode increases, the capacitive sensing signal is easier to monitor, and the capacitive sensing signal can be prevented from being affected by the ambient environment.

In an embodiment, continued reference may be made to FIG. 4. In other possible embodiments, along the direction perpendicular to the plane where the touch display panel is located, at least two touch electrodes 4 overlap the same contact electrode 5; and the detection sub-phase includes at least two detection frames. S211 where in each of the multiple detection sub-phases, the first detection signal is transmitted to the touch electrode overlapping any one contact electrode and the second detection signal is transmitted to the touch electrode overlapping the remaining contact electrode in the preceding embodiment may be refined into the following: in the at least two detection frames of the same detection sub-phase, the first detection signal is sequentially transmitted to different touch electrodes overlapping the same contact electrode and the second detection signal is sequentially transmitted to different touch electrodes overlapping the remaining contact electrode. S221 where the capacitive sensing signals generated by the touch electrode in response to the first detection signal or the second detection signal in the multiple detection sub-phases are acquired may be refined into the following: second capacitive sensing sub-signals generated by the different touch electrodes overlapping the same contact electrode in response to the first detection signal or the second detection signal in different detection frames of the same detection sub-phase are separately acquired; and the second capacitive sensing sub-signals are superimposed to form the capacitive sensing signal.

In an embodiment, in this embodiment, the detection sub-phase is divided into multiple detection frames, the detection signal is transmitted to only part of all the touch electrodes overlapping each contact electrode in each detection frame, and it is ensured that all the touch electrodes overlapping the contact electrode receive the detection signal in one detection sub-phase. In a certain detection sub-phase, the detection unit sequentially transmits the detection signal to part of the touch electrodes under each contact electrode and then acquires the second capacitive sensing sub-signals fed back by the touch electrodes in the detection frames. A second capacitive sensing sub-signal is a capacitive sensing signal of part of the touch electrodes under the same contact electrode. The detection unit adds signal quantities of the second capacitive sensing sub-signals of all the touch electrodes under the same contact electrode to obtain a signal quantity of the capacitive sensing signal of the touch electrodes under the contact electrode and uses the capacitive sensing signal after superimposition as a parameter for a subsequent signal comparison. In this manner, the signal quantity of the capacitive sensing signal can also be increased so that the capacitive sensing signal is easier to monitor, and the capacitive sensing signal is prevented from being affected by the ambient environment.

For example, with continued reference to FIG. 4, it is assumed that the contact electrodes 5 include the first contact electrode 51, the first contact sub-electrode 521, and the second contact sub-electrode 522, the first contact electrode 51 overlaps eight first touch electrodes 41, the first contact sub-electrode 521 overlaps two first touch sub-electrodes 421, the second contact sub-electrode 522 overlaps two second touch sub-electrodes 422, and each detection sub-phase includes two detection frames.

In a first detection frame of the first detection sub-phase, the detection unit may transmit the first detection signal to any four first touch electrodes and transmit the second detection signal to any one first touch sub-electrode and any one second touch sub-electrode. In a second detection frame of the first detection sub-phase, the detection unit transmits the first detection signal to the other four first touch electrodes and transmits the second detection signal to the other first touch sub-electrode and the other second touch sub-electrode. The detection unit uses a superimposition result of a second capacitive sensing sub-signal of one first touch sub-electrode in the first detection frame and a second capacitive sensing sub-signal of the other first touch sub-electrode in the second detection frame as the first capacitive sensing signal of the first touch sub-electrodes and uses a superimposition result of a second capacitive sensing sub-signal of one second touch sub-electrode in the first detection frame and a second capacitive sensing sub-signal of the other second touch sub-electrode in the second detection frame as the second capacitive sensing signal of the second touch sub-electrodes. The detection unit may also use a superimposition result of a second capacitive sensing sub-signal of four first touch electrodes in the first detection frame and a second capacitive sensing sub-signal of the other four first touch electrodes in the second detection frame as the seventh capacitive sensing signal of the first touch electrodes.

In a first detection frame of the second detection sub-phase, the detection unit may transmit the first detection signal to any one first touch sub-electrode and transmit the second detection signal to any four first touch electrodes and any one second touch sub-electrode. In a second detection frame of the second detection sub-phase, the detection unit transmits the first detection signal to the other first touch sub-electrode and transmits the second detection signal to the other four first touch electrodes and the other second touch sub-electrode. The detection unit uses a superimposition result of a second capacitive sensing sub-signal of one first touch sub-electrode in the first detection frame and a second capacitive sensing sub-signal of the other first touch sub-electrode in the second detection frame as the third capacitive sensing signal of the first touch sub-electrodes and uses a superimposition result of a second capacitive sensing sub-signal of one second touch sub-electrode in the first detection frame and a second capacitive sensing sub-signal of the other second touch sub-electrode in the second detection frame as the fourth capacitive sensing signal of the second touch sub-electrodes. The detection unit may also use a superimposition result of a second capacitive sensing sub-signal of four first touch electrodes in the first detection frame and a second capacitive sensing sub-signal of the other four first touch electrodes in the second detection frame as the eighth capacitive sensing signal of the first touch electrodes.

In a first detection frame of the third detection sub-phase, the detection unit may transmit the first detection signal to any one second touch sub-electrode and transmit the second detection signal to any four first touch electrodes and any one first touch sub-electrode. In a second detection frame of the third detection sub-phase, the detection unit transmits the first detection signal to the other second touch sub-electrode and transmits the second detection signal to the other four first touch electrodes and the other first touch sub-electrode. The detection unit uses a superimposition result of a second capacitive sensing sub-signal of one first touch sub-electrode in the first detection frame and a second capacitive sensing sub-signal of the other first touch sub-electrode in the second detection frame as the fifth capacitive sensing signal of the first touch sub-electrodes and uses a superimposition result of a second capacitive sensing sub-signal of one second touch sub-electrode in the first detection frame and a second capacitive sensing sub-signal of the other second touch sub-electrode in the second detection frame as the sixth capacitive sensing signal of the second touch sub-electrodes. The detection unit may also use a superimposition result of a second capacitive sensing sub-signal of four first touch electrodes in the first detection frame and a second capacitive sensing sub-signal of the other four first touch electrodes in the second detection frame as the ninth capacitive sensing signal of the first touch electrodes.

In an embodiment, the first detection signal is a ground signal, and the second detection signal is an analog voltage signal. In response to the ground signal, the touch electrode feeds back a capacitive sensing signal with a relatively low signal quantity. In response to the analog voltage signal, the touch electrode feeds back a capacitive sensing signal with a relatively high signal quantity.

In an embodiment, the analog voltage signal is a rectangular wave signal. The use of the rectangular wave signal as the analog voltage signal can make the capacitive sensing signal have a greater signal quantity and easier to monitor.

Of course, in other embodiments not illustrated, the analog voltage signal may be a voltage signal of any waveform, which is neither described in detail nor limited in the embodiments of the present disclosure. For example, in other embodiments, the analog voltage signal may be a sine wave signal, and the number of sine waves in one detection sub-phase may be set to 4 to 8, that is, an output frequency of the detection signal is reduced (for example, reduced to 20 to 40 kHz), so as to increase a duration of a single detection signal, which can also increase the quantity of the capacitive sensing signal.

In an embodiment, with continued reference to FIG. 3, the knob-type touch display device may further include a driver chip 6, the detection unit 3 is integrated into the driver chip 6, and the driver chip 6 is further configured to control the knob-type touch display device to perform image display in a working phase. S110 where in the self-detection phase, the first detection signal is transmitted to the touch electrode overlapping any one contact electrode and the second detection signal is transmitted to the touch electrode overlapping the remaining contact electrode in the preceding embodiment may include the following: in the self-detection phase, the detection unit transmits, through a signal output port of the driver chip, the ground signal or the rectangular wave signal to the touch electrode overlapping the contact electrode.

The driver chip may be a main drive unit of the display device. The driver chip may be, but is not limited to, an integrated chip of touch and display drive. Driven by the driver chip, the display device completes touch and image display. As an exemplary embodiment, the detection unit may be integrated into the driver chip, thereby improving integration of the drive unit of the display device and reducing an area occupied by the detection unit.

For example, in some embodiments of the present disclosure, both the ground signal and the rectangular wave signal may be directly output from the driver chip. For example, as shown in FIG. 3, the signal output port 61 of the driver chip 6 is electrically connected to each touch electrode 4 so that the ground signal or the rectangular wave signal is sent to the touch electrode 4 through the signal output port 61 of the driver chip 6. In this manner, a rectangular wave signal generation unit does not need to be additionally disposed in the display device, and an increase in an area of a bezel region is avoided.

For example, continued reference may be made to FIG. 8. In other possible embodiments, the knob-type touch display device may still include the driver chip 6, the detection unit 3 is integrated into the driver chip 6, and the driver chip 6 is further configured to control the knob-type touch display device to perform the image display in the working phase; and the knob-type touch display device may further include a signal output unit 7, where an end of the signal output unit 7 is electrically connected to the touch electrode 4, and the other end of the signal output unit 7 is electrically connected to the detection unit 3 through the signal output port 61 of the driver chip 6. S110 where in the self-detection phase, the first detection signal is transmitted to the touch electrode overlapping any one contact electrode and the second detection signal is transmitted to the touch electrode overlapping the remaining contact electrode in the preceding embodiments may include the following: in the self-detection phase, the detection unit transmits, through the signal output port of the driver chip, the ground signal or a third detection signal to the touch electrode overlapping the contact electrode, where the third detection signal is converted by the signal output unit into the rectangular wave signal.

In this embodiment, the rectangular wave signal may be obtained through conversion of another module. The signal output unit may be disposed in the display device, and the detection unit may be electrically connected to the touch electrode through the signal output unit. In this setting manner, the detection unit sends the ground signal and the third detection signal, where the third detection signal may be a signal waveform that can be sent by an existing driver chip, such as, but not limited to, the sine wave signal. The ground signal and the third detection signal are transmitted to the signal output unit through the signal output port of the driver chip, and the signal output unit is configured to convert the third detection signal into the rectangular wave signal. The ground signal remains unchanged through the signal output unit and is still transmitted to the touch electrode as the ground signal. The third detection signal is converted into the rectangular wave signal through the signal output unit, and the rectangular wave signal is transmitted to the touch electrode. The signal output unit is additionally disposed so that an existing output port of the driver chip can be directly used for outputting the detection signals, and the structure of the driver chip does not need to be changed.

In an embodiment, the self-detection phase includes a signal transmission period and a signal detection period, and the signal transmission period precedes the signal detection period in a time dimension; and in the signal transmission period, the detection unit transmits the detection signal to the touch electrode, and in the signal detection period, the detection unit acquires the capacitive sensing signal from the touch electrode and determines the current state of the knob according to the capacitive sensing signal.

In this embodiment, in the self-detection phase, the transmission of the detection signal and the detection of the capacitive sensing signal may be performed at different times, that is, the detection unit transmits the detection signal to the touch electrode in the signal transmission period and then detects, in the signal detection period, the capacitive sensing signal fed back by the touch electrode, thereby ensuring that enough time is provided for the detection signal to be transmitted to the touch electrode. When the self-detection phase includes the multiple detection sub-phases, each detection sub-phase may include the signal transmission period and the signal detection period.

In an embodiment, in the embodiment of the present disclosure, the self-detection phase is an initial time period for powering up the knob-type touch display device. That is, when the display device is powered on and up, the detection logics described in the embodiment of the present disclosure are executed. In this manner, abnormal bonding of the knob can be detected at once, preventing the knob from being applied in an abnormal state. Additionally, the gear of the knob is detected in the power-up so that during the subsequent rotation of the knob, a direction of rotation of the knob can be accurately determined, thereby ensuring gear detection accuracy during the normal application of the knob.

It is to be noted that the preceding are preferred embodiments of the present disclosure and technical principles used therein. It is to be understood by those skilled in the art that the present disclosure is not limited to the embodiments described herein, and those skilled in the art can make various apparent modifications, adaptations, combinations, and substitutions without departing from the scope of the present disclosure. Therefore, although the present disclosure has been described in detail through the preceding embodiments, the present disclosure is not limited to the preceding embodiments and may include other equivalent embodiments without departing from the concept of the present disclosure. The scope of the present disclosure is determined by the scope of the appended claims.

What is claimed is:

1. A knob-type touch display device, comprising:
a knob setting region;

a touch display panel comprising a plurality of touch electrodes, wherein part of the plurality of touch electrodes are disposed in the knob setting region;

a knob disposed on a light emission side of the touch display panel and in the knob setting region and comprising a plurality of contact electrodes, wherein along a direction perpendicular to a plane where the touch display panel is located, a contact electrode of the plurality of contact electrodes overlaps a respective touch electrode of the plurality of touch electrodes; and when the contact electrode is bonded to the touch display panel, the contact electrode and the touch electrode overlapping the contact electrode form capacitance; and a detection unit electrically connected to the touch electrode;

wherein the knob-type touch display device comprises a self-detection phase; and in the self-detection phase, the detection unit is configured to transmit a first detection signal to a touch electrode of the plurality of touch electrodes overlapping any one of the plurality of contact electrodes and transmit a second detection signal to a touch electrode of the plurality of touch electrodes overlapping a remaining contact electrode of the plurality of contact electrodes, wherein the first detection signal is different from the second detection signal; and the detection unit is further configured to acquire a capacitive sensing signal generated by the touch electrode in response to the first detection signal or the second detection signal and determine a current state of the knob according to the capacitive sensing signal.

2. The knob-type touch display device according to claim 1, wherein the self-detection phase comprises a plurality of detection sub-phases;

the detection unit is configured to, in each of the plurality of detection sub-phases, transmit the first detection signal to the touch electrode overlapping any one of the plurality of contact electrodes and transmit the second detection signal to the touch electrode overlapping the remaining contact electrode; wherein in different detection sub-phases, different touch electrodes receive the first detection signal; and the detection unit is further configured to acquire capacitive sensing signals generated by the touch electrode in response to the first detection signal or the second detection signal in the plurality of detection sub-phases and determine a current state of the contact electrode overlapping the touch electrode in conjunction with the capacitive sensing signals generated by the touch electrode in the plurality of detection sub-phases; and the detection unit is further configured to determine the current state of the knob according to current states of the plurality of contact electrodes.

3. The knob-type touch display device according to claim 1, wherein the knob further comprises a plurality of metal contacts arranged at intervals along a circumferential direction of the knob; and the plurality of contact electrodes comprise a first contact electrode and a second contact electrode, wherein the first contact electrode and the second contact electrode are arranged in a circle; during rotation of the knob, the first contact electrode is always in electrical contact with at least one of the plurality of metal contacts, and the second contact electrode is in electrical contact with or disconnected from a metal contact of the plurality of metal contacts so that the first contact electrode is connected to or disconnected from the second contact electrode through the plurality of metal contacts; and the plurality of touch electrodes comprise a first touch electrode and a second touch electrode, wherein along the direction perpendicular to the plane where the touch display panel is located, the first touch electrode overlaps the first contact electrode, and the second touch electrode overlaps the second contact electrode.

4. The knob-type touch display device according to claim 3, wherein the second contact electrode comprises a first contact sub-electrode and a second contact sub-electrode, and the second touch electrode comprises a first touch sub-electrode and a second touch sub-electrode; wherein along the direction perpendicular to the plane where the touch display panel is located, the first contact sub-electrode overlaps the first touch sub-electrode, and the second contact sub-electrode overlaps the second touch sub-electrode.

5. The knob-type touch display device according to claim 2, wherein along the direction perpendicular to the plane where the touch display panel is located, one touch electrode overlaps one contact electrode, and a projection of the touch electrode on the plane where the touch display panel is located covers a projection of the contact electrode on the plane where the touch display panel is located; or along the direction perpendicular to the plane where the touch display panel is located, at least two touch electrodes overlap a same contact electrode.

6. The knob-type touch display device according to claim 1, further comprising a driver chip, wherein the detection unit is integrated into the driver chip, and the driver chip is further configured to control the knob-type touch display device to perform image display in a working phase.

7. The knob-type touch display device according to claim 6, wherein the first detection signal is a ground signal, and the second detection signal is a rectangular wave signal; and in the self-detection phase, the detection unit is further configured to transmit, through a signal output port of the driver chip, the ground signal or the rectangular wave signal to the touch electrode overlapping the contact electrode; or the knob-type touch display device further comprises a signal output unit, wherein an end of the signal output unit is electrically connected to the touch electrode, and another end of the signal output unit is electrically connected to the detection unit through a signal output port of the driver chip; and in the self-detection phase, the detection unit is further configured to transmit, through the signal output port of the driver chip, the ground signal or a third detection signal to the touch electrode overlapping the contact electrode, wherein the third detection signal is converted by the signal output unit into the rectangular wave signal.

8. A detection method for a knob-type touch display device, the detection method being applied to the knob-type touch display device according to claim 1; and the detection method comprising:

in the self-detection phase, transmitting a first detection signal to the touch electrode overlapping any one of the plurality of contact electrodes and transmitting a second detection signal to the touch electrode overlapping a remaining contact electrode of the plurality of contact electrodes, wherein the first detection signal is different from the second detection signal; and acquiring a capacitive sensing signal generated by the touch electrode in response to the first detection signal or the second detection signal and determining a current state of the knob according to the capacitive sensing signal.

9. The detection method for a knob-type touch display device according to claim 8, wherein the self-detection phase comprises a plurality of detection sub-phases;
   in the self-detection phase, transmitting the first detection signal to the touch electrode overlapping any one of the plurality of contact electrodes and transmitting the second detection signal to the touch electrode overlapping the remaining contact electrode of the plurality of contact electrodes comprise:
   in each of the plurality of detection sub-phases, transmitting the first detection signal to the touch electrode overlapping any one of the plurality of contact electrodes and transmitting the second detection signal to the touch electrode overlapping the remaining contact electrode; wherein in different detection sub-phases, different touch electrodes receive the first detection signal; and
   acquiring the capacitive sensing signal generated by the touch electrode in response to the first detection signal or the second detection signal and determining the current state of the knob according to the capacitive sensing signal comprise:
   acquiring capacitive sensing signals generated by the touch electrode in response to the first detection signal or the second detection signal in the plurality of detection sub-phases;
   determining a current state of the contact electrode overlapping the touch electrode in conjunction with the capacitive sensing signals generated by the touch electrode in the plurality of detection sub-phases; and
   determining the current state of the knob according to current states of the plurality of contact electrodes.

10. The detection method for a knob-type touch display device according to claim 9, wherein the knob further comprises a plurality of metal contacts arranged at intervals along a circumferential direction of the knob;
   the plurality of contact electrodes comprise a first contact electrode and a second contact electrode, wherein the first contact electrode and the second contact electrode are arranged in a circle; during rotation of the knob, the first contact electrode is always in electrical contact with at least one of the plurality of metal contacts, and the second contact electrode is in electrical contact with or disconnected from a metal contact of the plurality of metal contacts so that the first contact electrode is connected to or disconnected from the second contact electrode through the plurality of metal contacts; and the plurality of touch electrodes comprise a first touch electrode and a second touch electrode, wherein along the direction perpendicular to the plane where the touch display panel is located, the first touch electrode overlaps the first contact electrode, and the second touch electrode overlaps the second contact electrode;
   determining the current state of the contact electrode overlapping the touch electrode in conjunction with the capacitive sensing signals generated by the touch electrode in the plurality of detection sub-phases comprises:
   determining a connection state between the second contact electrode and the first contact electrode according to a comparison result of capacitive sensing signals generated by the first touch electrode and the second touch electrode in the plurality of detection sub-phases; and
   determining the current state of the knob according to the current states of the plurality of contact electrodes comprises:
   determining a current gear state of the knob according to the connection state between the second contact electrode and the first contact electrode.

11. The detection method for a knob-type touch display device according to claim 10, wherein the second contact electrode comprises a first contact sub-electrode and a second contact sub-electrode, and the second touch electrode comprises a first touch sub-electrode and a second touch sub-electrode; wherein along the direction perpendicular to the plane where the touch display panel is located, the first contact sub-electrode overlaps the first touch sub-electrode, and the second contact sub-electrode overlaps the second touch sub-electrode;
   the self-detection phase comprises a first detection sub-phase, a second detection sub-phase, and a third detection sub-phase;
   in each of the plurality of detection sub-phases, transmitting the first detection signal to the touch electrode overlapping any one of the plurality of contact electrodes and transmitting the second detection signal to the touch electrode overlapping the remaining contact electrode comprise:
   in the first detection sub-phase, transmitting the first detection signal to the first touch electrode and transmitting the second detection signal to the first touch sub-electrode and the second touch sub-electrode;
   in the second detection sub-phase, transmitting the first detection signal to the first touch sub-electrode and transmitting the second detection signal to the first touch electrode and the second touch sub-electrode; and
   in the third detection sub-phase, transmitting the first detection signal to the second touch sub-electrode and transmitting the second detection signal to the first touch electrode and the first touch sub-electrode;
   acquiring the capacitive sensing signals generated by the touch electrode in response to the first detection signal or the second detection signal in the plurality of detection sub-phases comprises:
   in the first detection sub-phase, acquiring a first capacitive sensing signal generated by the first touch sub-electrode and a second capacitive sensing signal generated by the second touch sub-electrode;
   in the second detection sub-phase, acquiring a third capacitive sensing signal generated by the first touch sub-electrode and a fourth capacitive sensing signal generated by the second touch sub-electrode; and
   in the third detection sub-phase, acquiring a fifth capacitive sensing signal generated by the first touch sub-electrode and a sixth capacitive sensing signal generated by the second touch sub-electrode;
   determining the connection state between the second contact electrode and the first contact electrode according to the comparison result of the capacitive sensing signals generated by the first touch electrode and the second touch electrode in the plurality of detection sub-phases comprises:
   determining a connection state between the first contact sub-electrode and the first contact electrode according to at least one of: a comparison result of the first capacitive sensing signal and the third capacitive sensing signal, or a comparison result of the fifth capacitive sensing signal and the third capacitive sensing signal; and determining a connection state between the second contact sub-electrode and the first contact electrode according to at least one of: a comparison result of the second capacitive sensing signal and the sixth capacitive sensing signal, or a comparison result of the fourth capacitive sensing signal and the sixth capacitive sensing signal; and determining the current gear state of the knob according to the connection state between the second contact electrode and the first contact electrode comprises:

determining the current gear state of the knob according to the connection state between the first contact sub-electrode and the first contact electrode and the connection state between the second contact sub-electrode and the first contact electrode.

12. The detection method for a knob-type touch display device according to claim 11, wherein determining the connection state between the first contact sub-electrode and the first contact electrode according to at least on of: the comparison result of the first capacitive sensing signal and the third capacitive sensing signal, or the comparison result of the fifth capacitive sensing signal and the third capacitive sensing signal comprises:

determining that the first contact sub-electrode is connected to the first contact electrode in at least one of the following cases: a difference between the first capacitive sensing signal and the third capacitive sensing signal is less than a first reference value, or a difference between the fifth capacitive sensing signal and the third capacitive sensing signal is less than the first reference value; and determining that the first contact sub-electrode is disconnected from the first contact electrode in at least one of the following cases: the difference between the first capacitive sensing signal and the third capacitive sensing signal is greater than or equal to the first reference value and/or the difference between the fifth capacitive sensing signal and the third capacitive sensing signal is greater than or equal to the first reference value; and determining the connection state between the second contact sub-electrode and the first contact electrode according to at least one of: the comparison result of the second capacitive sensing signal and the sixth capacitive sensing signal, or the comparison result of the fourth capacitive sensing signal and the sixth capacitive sensing signal comprises:

determining that the second contact sub-electrode is connected to the first contact electrode in at least one of following cases: a difference between the second capacitive sensing signal and the sixth capacitive sensing signal is less than a second reference value, or a difference between the fourth capacitive sensing signal and the sixth capacitive sensing signal is less than the second reference value; and determining that the second contact sub-electrode is disconnected from the first contact electrode in at least one of following cases: the difference between the second capacitive sensing signal and the sixth capacitive sensing signal is greater than or equal to the second reference value and/or the difference between the fourth capacitive sensing signal and the sixth capacitive sensing signal is greater than or equal to the second reference value.

13. The detection method for a knob-type touch display device according to claim 10, before determining the connection state between the second contact electrode and the first contact electrode according to the comparison result of the capacitive sensing signals generated by the first touch electrode and the second touch electrode in the plurality of detection sub-phases, further comprising:

in a case where a difference between capacitive sensing signals generated by the first touch electrode in different detection sub-phases is greater than or equal to a third reference value, determining that the first contact electrode is normally bonded to the touch display panel.

14. The detection method for a knob-type touch display device according to claim 13, wherein the second contact electrode comprises a first contact sub-electrode and a second contact sub-electrode, and the second touch electrode comprises a first touch sub-electrode and a second touch sub-electrode; wherein along the direction perpendicular to the plane where the touch display panel is located, the first contact sub-electrode overlaps the first touch sub-electrode, and the second contact sub-electrode overlaps the second touch sub-electrode;

the self-detection phase comprises a first detection sub-phase, a second detection sub-phase, and a third detection sub-phase;

in each of the plurality of detection sub-phases, transmitting the first detection signal to the touch electrode overlapping any one of the plurality of contact electrodes and transmitting the second detection signal to the touch electrode overlapping the remaining contact electrode comprise:

in the first detection sub-phase, transmitting the first detection signal to the first touch electrode and transmitting the second detection signal to the first touch sub-electrode and the second touch sub-electrode;

in the second detection sub-phase, transmitting the first detection signal to the first touch sub-electrode and transmitting the second detection signal to the first touch electrode and the second touch sub-electrode; and in the third detection sub-phase, transmitting the first detection signal to the second touch sub-electrode and transmitting the second detection signal to the first touch electrode and the first touch sub-electrode;

acquiring the capacitive sensing signals generated by the touch electrode in response to the first detection signal or the second detection signal in the plurality of detection sub-phases comprises:

in the first detection sub-phase, acquiring a seventh capacitive sensing signal generated by the first touch electrode; in the second detection sub-phase, acquiring an eighth capacitive sensing signal generated by the first touch electrode; and in the third detection sub-phase, acquiring a ninth capacitive sensing signal generated by the first touch electrode; and in the case where the difference between the capacitive sensing signals generated by the first touch electrode in the different detection sub-phases is greater than or equal to the third reference value, determining that the first contact electrode is normally bonded to the touch display panel comprises:

determining that the first contact electrode is normally bonded to the touch display panel in at least one of the following cases: a difference between the eighth capacitive sensing signal and the seventh capacitive sensing signal is greater than or equal to the third reference value, or a difference between the ninth capacitive sensing signal and the seventh capacitive sensing signal is greater than or equal to the third reference value.

15. The detection method for a knob-type touch display device according to claim 14, further comprising: determining that the first contact electrode is abnormally bonded to the touch display panel in at least one of the following cases: the difference between the eighth capacitive sensing signal and the seventh capacitive sensing signal is less than the third reference value, or the difference between the ninth capacitive sensing signal and the seventh capacitive sensing signal is less than the third reference value; and sending an alarm for an abnormal bonding state.

16. The detection method for a knob-type touch display device according to claim 10, wherein determining the connection state between the second contact electrode and the first contact electrode according to the comparison result of the capacitive sensing signals generated by the first touch electrode and the second touch electrode in the plurality of detection sub-phases comprises:

determining, according to a comparison result of capacitive sensing signals generated by the first touch electrode and the second touch electrode in a same detection sub-phase, a connection sub-state between the second contact electrode and the first contact electrode in the detection sub-phase; and determining the connection state between the second contact electrode and the first contact electrode in conjunction with connection sub-states between the second contact electrode and the first contact electrode in different detection sub-phases.

17. The detection method for a knob-type touch display device according to claim 9, wherein at least one of the plurality of detection sub-phases is repeatedly executed, and a repeatedly executed detection sub-phase is a repetitive detection sub-phase; and acquiring the capacitive sensing signals generated by the touch electrode in response to the first detection signal or the second detection signal in the plurality of detection sub-phases comprises:

acquiring a first capacitive sensing sub-signal generated by the touch electrode in response to the first detection signal or the second detection signal in a same repetitive detection sub-phase; and determining a capacitive sensing signal of the touch electrode in the repetitive detection sub-phase in conjunction with first capacitive sensing sub-signals.

18. The detection method for a knob-type touch display device according to claim 9, wherein along the direction perpendicular to the plane where the touch display panel is located, one touch electrode overlaps one contact electrode, and a projection of the touch electrode on the plane where the touch display panel is located covers a projection of the contact electrode on the plane where the knob-type touch display panel is located;

in each of the plurality of detection sub-phases, transmitting the first detection signal to the touch electrode overlapping any one of the plurality of contact electrodes and transmitting the second detection signal to the touch electrode overlapping the remaining contact electrode comprise:

in each of the plurality of detection sub-phases, transmitting the first detection signal to one touch electrode overlapping any one of the plurality of contact electrodes and transmitting the second detection signal to the touch electrode overlapping the remaining contact electrode.

19. The detection method for a knob-type touch display device according to claim 9, wherein along the direction perpendicular to the plane where the touch display panel is located, at least two touch electrodes overlap a same contact electrode; and each of the plurality of detection sub-phases comprises at least two detection frames;

in the self-detection phase, transmitting the first detection signal to the touch electrode overlapping any one of the plurality of contact electrodes and transmitting the second detection signal to the touch electrode overlapping the remaining contact electrode of the plurality of contact electrodes further comprise:

in the at least two detection frames of a same detection sub-phase, sequentially transmitting the first detection signal to different touch electrodes overlapping a same contact electrode and sequentially transmitting the second detection signal to different touch electrodes overlapping the remaining contact electrode; and acquiring the capacitive sensing signals generated by the touch electrode in response to the first detection signal or the second detection signal in the plurality of detection sub-phases comprises:

separately acquiring second capacitive sensing sub-signals generated by the different touch electrodes overlapping the same contact electrode in response to the first detection signal or the second detection signal in different detection frames of the same detection sub-phase; and superimposing the second capacitive sensing sub-signals to form the capacitive sensing signal.

20. The detection method for a knob-type touch display device according to claim 8, wherein the first detection signal is a ground signal, the second detection signal is a rectangular wave signal, the knob-type touch display device further comprises a driver chip, the detection unit is integrated into the driver chip, and the driver chip is further configured to control the knob-type touch display device to perform image display in a working phase;

in the self-detection phase, transmitting the first detection signal to the touch electrode overlapping any one of the plurality of contact electrodes and transmitting the second detection signal to the touch electrode overlapping the remaining contact electrode of the plurality of contact electrodes comprise: in the self-detection phase, transmitting, by the detection unit and through a signal output port of the driver chip, the ground signal or the rectangular wave signal to the touch electrode overlapping the contact electrode; or the knob-type touch display device further comprises a signal output unit, wherein an end of the signal output unit is electrically connected to the touch electrode, and another end of the signal output unit is electrically connected to the detection unit through a signal output port of the driver chip; and in the self-detection phase, transmitting the first detection signal to the touch electrode overlapping any one of the plurality of contact electrodes and transmitting the second detection signal to the touch electrode overlapping the remaining contact electrode of the plurality of contact electrodes comprise: in the self-detection phase, transmitting by the detection unit and through the signal output port of the driver chip, the ground signal or a third detection signal to the touch electrode overlapping the contact electrode, wherein the third detection signal is converted by the signal output unit into the rectangular wave signal.

* * * * *